United States Patent [19]
Nishiguchi

[11] Patent Number: 5,724,603
[45] Date of Patent: Mar. 3, 1998

[54] SINGLE-CHIP MICROCOMPUTER WITH ASYNCHRONOUSLY ACCESSIBLE USER DESIGNED CIRCUIT

[75] Inventor: Yukihiro Nishiguchi, Tokyo, Japan

[73] Assignee: NEC Corporation, Tokyo, Japan

[21] Appl. No.: 323,093

[22] Filed: Oct. 14, 1994

[30] Foreign Application Priority Data

Oct. 13, 1993 [JP] Japan .................. 5-280144

[51] Int. Cl.$^6$ ........................... G06F 13/00
[52] U.S. Cl. .................. 395/800.33; 395/800.43; 395/183.06; 395/821
[58] Field of Search ............... 395/800, 575, 395/725, 775, 375, 800.01, 821, 800.43

[56] References Cited

U.S. PATENT DOCUMENTS

| | | | |
|---|---|---|---|
| 5,089,951 | 2/1992 | Iijima | 395/856 |
| 5,113,093 | 5/1992 | Tashiro et al. | 326/16 |
| 5,155,819 | 10/1992 | Watkins et al. | 395/375 |
| 5,220,673 | 6/1993 | Dalrymple et al. | 395/775 |
| 5,228,139 | 7/1993 | Miwa et al. | 395/575 |
| 5,247,521 | 9/1993 | Akao et al. | 395/183.03 |
| 5,363,380 | 11/1994 | Shinohara | 395/183.01 |
| 5,386,573 | 1/1995 | Okamoto | 395/725 |
| 5,416,919 | 5/1995 | Ogino et al. | 395/183.06 |
| 5,426,769 | 6/1995 | Pawloski | 395/500 |
| 5,428,770 | 6/1995 | Garner | 395/575 |
| 5,438,681 | 8/1995 | Mensch, Jr. | 395/800 |

FOREIGN PATENT DOCUMENTS 358141A 3/1991 Japan .

Primary Examiner—Alyssa H. Bowler
Assistant Examiner—Walter D. Davis
Attorney, Agent, or Firm—Whitham, Curtis, Whitham & McGinn

[57] ABSTRACT

A single-chip microcomputer is constituted by a single-chip microcomputer core, an external bus interface circuit, an external bus, a logic circuit and a bus interface. For asynchronously accessing to an exterior from the single-chip microcomputer core, the external bus interface circuit produces an asynchronous access control signal to the exterior based on an access control signal from the single-chip microcomputer core. The internal bus interconnects the single-chip microcomputer core and the external bus interface circuit, and the logic circuit is asynchronously accessible to and from the single-chip microcomputer core. The bus interface circuit is connected to the internal bus and produces an asynchronous access control signal to the logic circuit based on an access control signal inputted through the internal bus. Even when the user logic unit is designed with operating clocks independent from the operating clocks of the single-chip microcomputer, the function of the user logic unit is not bound by any significant limitations, and the number of steps involved in preparing the user logic test pattern is reduced.

12 Claims, 18 Drawing Sheets

SINGLE-CHIP MICROCOMPUTER WITH ASYNCHRONOUSLY ACCESSIBLE USER DESIGNED CIRCUIT

BACKGROUND OF THE INVENTION

(1) Field of the Invention

The present invention relates to a single-chip microcomputer, and more particularly to a single-chip microcomputer in which a circuit designed by a user is built in.

(2) Description of the Related Art

A single-chip microcomputer has a wide field of applications. The user uses a standard single-chip microcomputer designed by makers.

Recently, from the desire of users to distinguish their microcomputers from those of competitors, there is a demand for building-in users' own circuits in a single-chip microcomputer instead of using standard single-chip microcomputers.

That is, as shown in FIG. 1, a single-chip microcomputer 206 performs the desired operations with a CPU 201 executing instructions read out from a memory unit 202 and controlling a peripheral function unit 203. Here, the CPU 201, the memory unit 202 and the peripheral function unit 203 are interconnected through an internal bus 205.

A user logic unit 204 is equipped with and an interface circuit (not illustrated) forming an interface with the internal bus 205 and is controlled by the CPU 201 through the internal bus 205. That is, the user logic unit 204 is configured so as to be handled in the same way as the peripheral function unit 203.

Whereas the CPU 201, the memory unit 202 and the peripheral function unit 203 are those designed by respective single-chip microcomputer makers, the user logic unit 204 is one in which the circuit design is made by the user and which is supplied to the maker concerned.

The maker of the single-chip microcomputer 206 mounts to such microcomputer 206 the user logic unit 204 supplied by the user and connects the user logic unit 204 to the internal bus 205.

The aforementioned conventional single-chip microcomputer uses the internal bus to interconnect the CPU and the user logic unit. Generally, the internal bus is designed so as to be most suited to the internal controlling of the single-chip microcomputer.

That is, the internal bus is synchronous with the CPU operation clocks and is arranged so as to operate at high speed and is constructed with complex timings. For example, the time as for set-up and holding of address data for a data read or write signal is very short.

Since the user logic unit is designed by the user who has no knowledge of the operation within the single-chip microcomputer, it will be very difficult to design the user logic unit so as to match the internal bus timings.

Also, since the user logic unit is presumably designed to synchronize with clocks which are unrelated to the operation clocks of the single-chip microcomputer, it will be difficult to connect the user logic unit to the internal bus which operates synchronously with the timings of the operation clocks of the single-chip microcomputer. For this reason, there will be a great limitation to the functionality of the user logic unit.

The user designing the user logic unit conducts a test of such logic by using test patterns for detecting whether or not the logic circuit operates as expected. The test patterns are prepared for accessing to the user logic unit with the timings of the internal bus.

When the user logic unit built in the single-chip microcomputer is tested, the test is carried out with the CPU executing instructions. Thus, it is necessary to use such test patterns that take into account the operation of the CPU.

Thus, since the test patterns prepared by the user are different from the test patterns used at the testing of the user logic unit in the single-chip microcomputer, it is necessitated to prepare new test patterns.

As a method to solve the above problem, a technology has been disclosed in Japanese Patent Application Kokai Publication No. Hei 3-058141. According to this technology, a dedicated bus is provided to each of the CPU and the user logic unit, and it is so arranged that the connection of the dedicated bus of the CPU and the dedicated bus of the user logic unit to the external terminal is switched in response to a test signal, so that one of such buses is connected to the external terminal.

However, in the foregoing conventional method, since the user logic function is dependent on the internal bus, the great limitation to functionality of the user logic unit is unavoidable as already pointed out above.

SUMMARY OF THE INVENTION

An object of the present invention, therefore, is to overcome the problems existing in the prior art and to provide a single-chip microcomputer in which, even in the case where the user logic unit is designed as to be synchronous with the operation clocks which are unrelated to operation clocks of the single-chip microcomputer, the function of the user logic is not subjected to a great limitation, and which enables reducing the number of steps in preparing test patterns for the user logic unit.

According to one aspect of the invention, there is a microcomputer core which has a central processing unit (CPU), a memory unit, a peripheral function unit, and a main internal bus interconnecting the units under control of a CPU operation clock signal supplied from the CPU;

an external bus interface circuit forming an asynchronous interface between the single-chip microcomputer and external circuits exterior thereto by enabling the single-chip microcomputer to have asynchronous access independent of the CPU operation clock signal to and from the external circuits;

an asynchronous internal bus for interconnecting the microcomputer core and the external bus interface circuit so as to enable the asynchronous access to and from the external circuits;

a logic circuit for receiving the asynchronous access from both the microprocessor core and the external circuits through the asynchronous internal bus to provide functions specific to a user of the single-chip microcomputer; and a bus interface circuit forming an interface between the asynchronous internal bus and the logic circuit by providing an asynchronous access control signal based on an access control signal supplied through the asynchronous internal bus.

According to the invention, the asynchronous access control signal to the exterior is produced based on the access control signal from the single-chip microcomputer core by the external bus interface circuit, and the asynchronous access control signal to the logic circuit which signal is accessible asynchronously to and from the single-chip microcomputer core is produced based on the access control signal from the exterior or the single-chip microcomputer core by the bus interface circuit connected to the internal bus between the single-chip microcomputer core and the external bus interface circuit. Thus, even when designed with operating clocks which are independent from the operating clocks of the single-chip microcomputer, the user logic is not bound by any significant limitations by the functions of the user logic, and the number of the steps involved in preparing the test pattern of the user logic unit can be reduced.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 1:
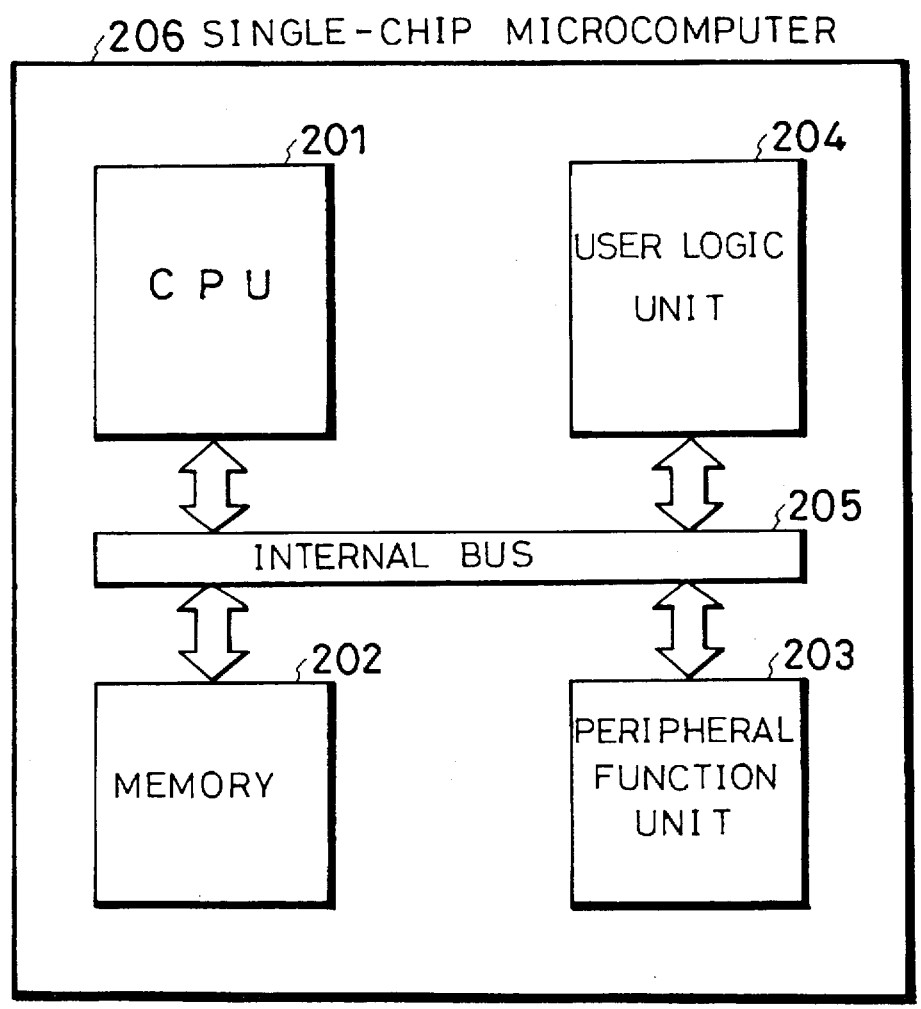
FIG. 1 is a block diagram showing a configuration of a conventional single-chip microcomputer.
Figure 2:
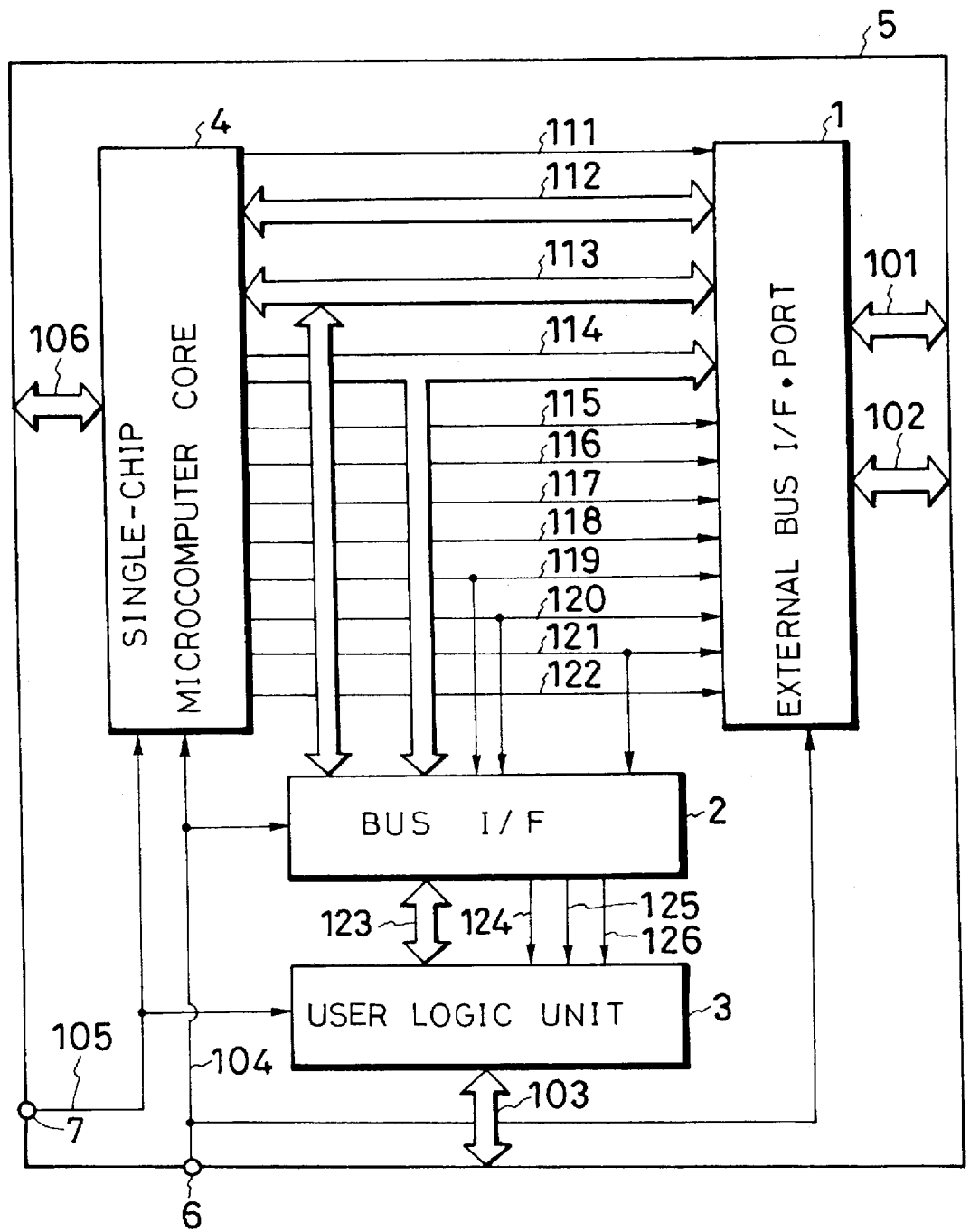
FIG. 2 is a block diagram showing a configuration of a single-chip microcomputer of a first embodiment according to the invention.

FIG. 2 shows in a block diagram an arrangement in a first embodiment according to the invention. A single-chip microcomputer 5 comprises an external bus interface port (hereinafter referred to as "external bus I/F·port") 1, a bus interface (hereinafter referred to as "bus I/F") 2, a user logic unit 3, and a single-chip microcomputer core (hereinafter referred to as "microcomputer core") 4. The external bus I/F·port 1 is for making connections with such external integrated circuits as memory units and peripheral LSIs (not illustrated). The bus I/F is a timing conversion circuit and interconnects the user logic unit 3 and the microcomputer core 4.

The external bus I/F·port 1 is used as a general purpose port when the external bus is not being used. The external bus I/F·port 1 is connected to external integrated circuits through an address data bus ($P_{00-03}/AD_{0-3}$) 101 and a control bus (inversion signal of $P_{10-13}/RD$, inversion signal of WR, and ASTB) 102.

Further, the external bus I/F·port 1 is connected to the microcomputer core 4 through a data bus ($DB_{0-3}$) 113 for the external bus, an external bus address bus ($AB_{0-3}$) 114 for the external bus, a write signal line (inversion signal of EXWR) 119 for the external bus, a read signal line (inversion signal of EXRD) 120 for the external bus, an address strobe signal line (AS) 121, and an external access mode signal line (EXA) 122.

Also, as being a port of general purpose, the external bus I/F·port 1 is connected to the microcomputer core 4 through an output mode signal line ($P_0OUT/P_1OUT$) 111, a data bus ($PD_{0-3}$) 112 for the port, a write signal line ($P_0WR$) 115 for a port 0, a read signal line ($P_0RD$) 116 for the port 0, a write signal line ($P_1WR$) 117 for a port 1, and a read signal line ($P_1RD$) 118 for the port 1.

The bus I/F 2 is connected to the data bus 113 for the external bus between the external bus I/F·port 1 and the microcomputer core 4, the address bus 114 for the external bus, the write signal line 119 for the external bus, the read signal line 120 for the external bus, and the address strobe signal line 121.

Also, the bus I/F 2 is connected to a user logic unit 3 through a user logic address data bus ($ULAD_{0-3}$) 123, a user logic write signal line (inversion signal of ULWR) 124, a user logic read signal line (inversion signal of ULRD) 125, and a user logic address strobe signal line (ULAS) 126.

The user logic unit 3 is connected to the exterior through a user input/output line 103. Also, a test signal (TEST) 104 inputted from a terminal 6 is supplied to each of the external bus I/F·port 1, the bus I/F 2 and the microcomputer core 4, and a reset signal 105 inputted from a terminal 7 is supplied to each of the user logic unit 3 and the microcomputer core 4.

The microcomputer core 4 mainly comprises a memory unit, a peripheral function unit, a CPU (not shown), and a main internal bus and has outward connections through a microcomputer input/output line 106. For brevity of the explanation, the foregoing single-chip microcomputer 5 is assumed to have 4-bit microcomputers.

Figure 3:
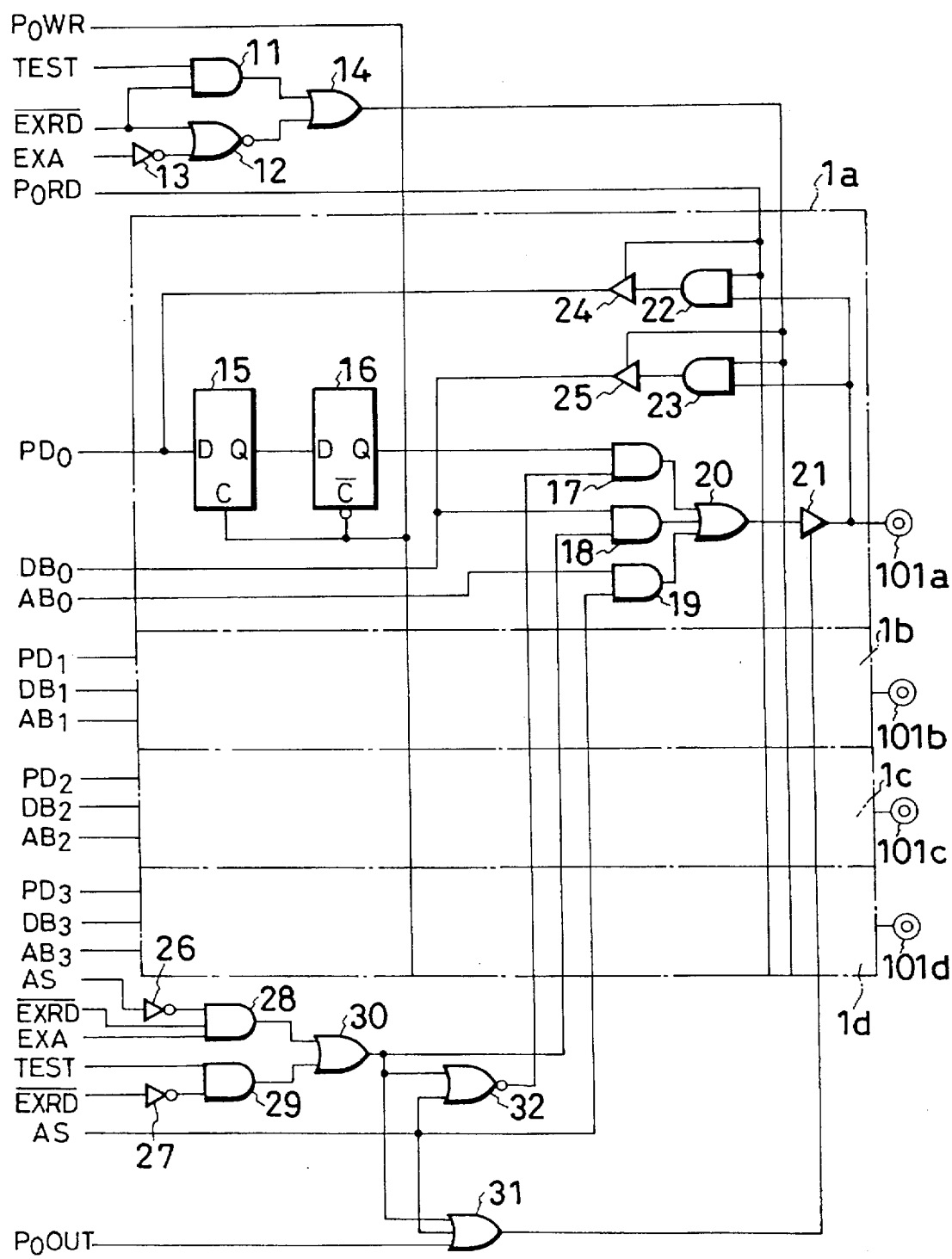
FIG. 3 is a diagram showing a configuration of an external bus I/F·port in the embodiment according to the invention shown in FIG. 2.
Figure 4:
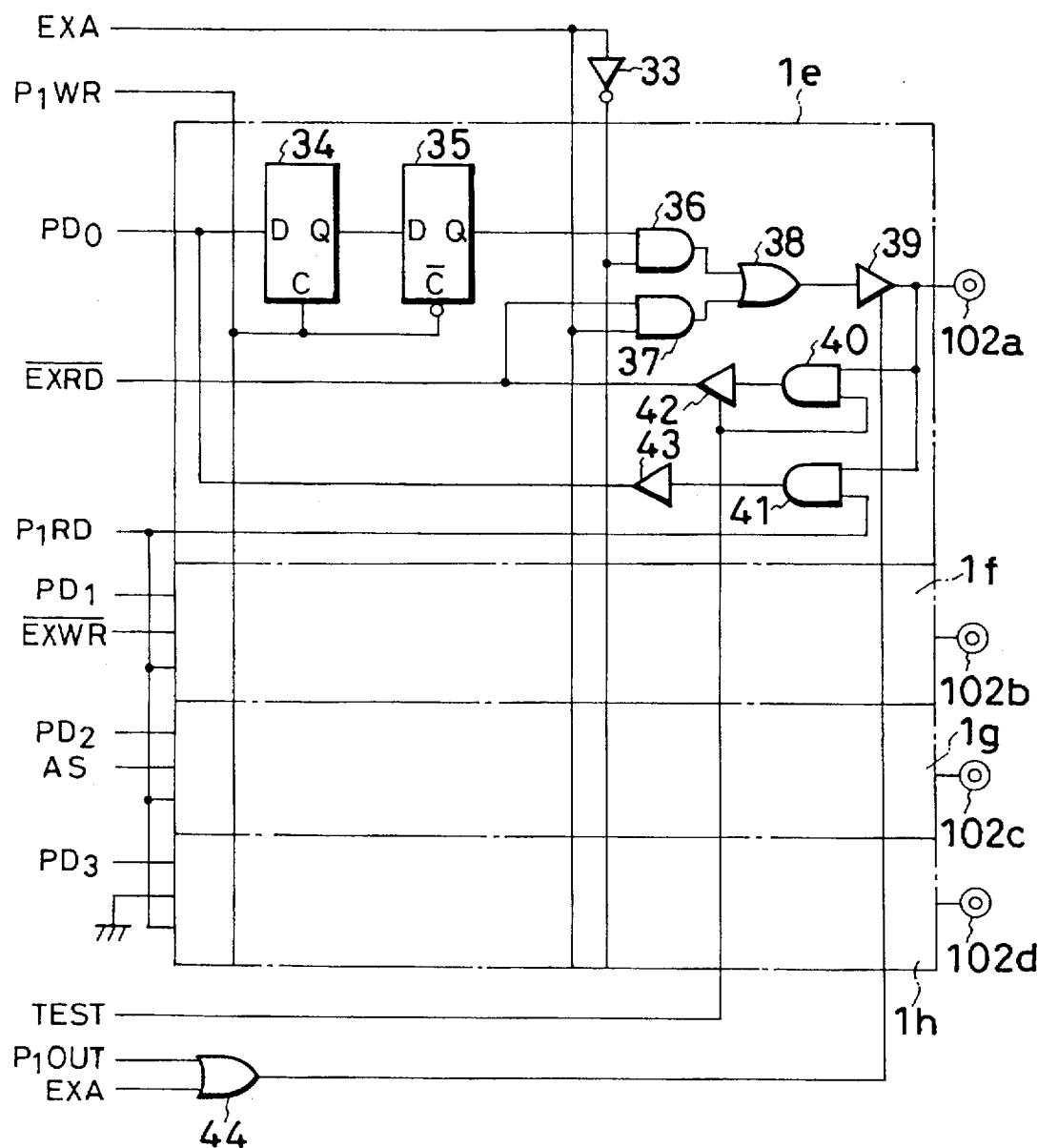
FIG. 4 is a diagram showing a configuration of an external bus I/F·port (at the side where this port is connected to a control bus) in the embodiment according to the invention shown in FIG. 2.

FIGS. 3 and 4 show a structural arrangement of the external bus I/F·port 1 shown in FIG. 2. FIG. 3 shows an arrangement at the side where the external bus I/F·port 1 is connected to the address data bus 101, and FIG. 4 shows an arrangement at the side where the external bus I/F·port 1 is connected to the control bus 102.

Interface circuits (hereinafter referred to as I/F circuits) 1a~1d of the external bus I/F·port 1 are provided so as to correspond to the respective bits ($P_{00}$~$P_{03}$/$AD_0$~$AD_3$) of the address data bus 101, and each of such circuits comprises latches 15 and 16, AND gates 17~19, 22 and 23, an OR gate 20, an output buffer 21, and bus buffers 24 and 25.

Also, at the side where the external bus I/F·port 1 is connected to the address data bus 101, there are AND gates 11, 28 and 29, NOR gates 12 and 32, OR gates 14, 30 and 31, and inverters 13, 26 and 27.

The AND gate 11 takes an AND logic of the test signal (TEST) 104 and the external bus read signal (inversion signal of EXRD) 120, and the result of the operation is outputted to the OR gate 14. The NOR gate 12 takes a NOR logic of the external bus read signal 120 and an external access mode signal (EXA) 122 inverted by the inverter 13, and the result of the operation is outputted to the OR gate 14.

The OR gate 14 takes an OR logic of the output of the AND gate 11 and the output of the NOR gate 12, and the result of the operation is outputted to each AND gate 23 of the I/F circuits 1a~1d and to the bus buffer 24.

Each latch 15 of the I/F circuits 1a~1d latches each of bits $PD_0$~$PD_3$ of the port data bus 112 in response to the write signal ($P_0$WR) 115 of the port 0, and its value is outputted to the latch 16. The latch 16 latches the output of the latch 15 in response to the inverted value of the write signal ($P_0$WR) 115 of the port 0 and outputs its value to the AND gate 17.

The AND gate 17 takes an AND logic of the output of the latch 16 and the output of the NOR gate 32, and the result of the operation is outputted to the OR gate 20. The AND gate 18 takes an AND logic of each of bits $DB_0$~$DB_3$ of the external bus data bus 113 and the output of the OR gate 30, and the result of the operation is outputted to the OR gate 20. The AND gate 19 takes an AND logic of each of bits $AB_0$~$AB_3$ of the external bus address bus 114 and address strobe signal (AS) 121, and the result of the operation is outputted to the OR gate 20.

The OR gate 20 takes an OR logic of the outputs of the AND gates 17~19 and the result of the operation is outputted to the output buffer 21. Responding to the output of the OR gate 31, the output buffer 21 outputs its contents to the terminals 101a~101d corresponding to respective bits ($P_{00}$~$P_{03}$/$AD_0$~$AD_3$) of the address data bus 101.

The AND gate 22 takes an AND logic of the read signal ($P_0$RD) 116 of the port 0 and the output of the terminals 101a~101d, and the result of the operation is outputted to the bus buffer 24. The AND gate 23 takes an AND logic of the output of the OR gate 14 and the output of the terminals 101a~101d, and the result of the operation is outputted to the bus buffer 25.

Responding to the read signal ($P_0$RD) 115 of the port 0, the bus buffer 24 outputs its contents to respective bits $PD_0$~$PD_3$ of the port data bus 112. Also, responding to the OR gate 14, the bus buffer 25 outputs its contents to respective bits $DB_0$~$DB_3$ of the external bus data bus 113.

The AND gate 28 takes an AND logic of the external bus read signal 120, the address strobe signal 121 inverted by the inverter 26, and the external access mode signal 122, and the result of the operation is outputted to the OR gate 30.

The AND gate 29 takes an AND logic of the test signal 104 and the external bus read signal 120 inverted by the inverter 27, and the result of the operation is outputted to the OR gate 30.

The OR gate 30 takes an OR logic of the outputs of the AND gates 28 and 29, and the result of the operation is outputted to the AND gate 19, the OR gate 31 and the NOR gate 32. The OR gate 31 takes an OR logic of the output of the OR gate 30, the address strobe signal 121 and the output mode signal ($P_0$OUT) 111, and the result of the operation is outputted to the output buffer 21.

The NOR gate 32 takes a NOR logic of the output of the OR gate 30 and the address strobe signal 121, and the result of the operation is outputted to the AND gate 17.

The I/F circuits 1e~1h of the external bus I/F·port 1 are provided so as to correspond to the respective bits (inversion signal of $P_{10}$~$P_{13}$/RD, inversion signal of WR, ASTB) of the control bus 102, and each circuit comprises latches 34 and 35, AND gates 36, 37, 40 and 41, an OR gate 38, an output buffer 39, and bus buffers 42 and 43.

Also, at the side where the external bus I/F·port 1 is connected to the control bus 102, there are an inverter 33 and an OR gate 44. The inverter 33 inverts the external access mode signals 122 and outputs to respective I/F circuits 1e~1h.

Each latch 34 of the I/F circuits 1e~1e latches each of bits $PD_0$~$PD_3$ of the port data bus 112 in response to the write signal ($P_1$WR) 117 of the port 1, and outputs its value to the latch 35. The latch 35 latches the output of the latch 34 in response to the inverted value of the write signal ($P_1$WR) 117 of the port 1 and outputs its value to the AND gate 36.

The AND gate 36 takes an AND logic of the output of the latch 35 and the external access mode signal 122 inverted by the inverter 33, and the result of the operation is outputted to the OR gate 38. The AND gate 37 takes an AND logic of the external bus read signal 120 and the external access mode signal 122, and the result of the operation is outputted to the OR gate 38.

The OR gate 38 takes an OR logic of the outputs of the AND gates 36 and 37, and the result of the operation is outputted to the output buffer 39. Responding to the output of the OR gate 44, the output buffer 39 outputs its contents to the terminals 102a~102d corresponding to respective bits (inversion signal of $P_{10}$~$P_{13}$/RD, inversion signal of WR, ASTB) of the control bus 102.

The AND gate 40 takes an AND logic of the output of the terminals 102a~102d and the test signal 104, and the result of the operation is outputted to the bus buffer 42. The AND gate 41 takes an AND logic of the output of the terminals 102a~102d and the read signal ($P_1$RD) 118 of the port 1, and the result of the operation is outputted to the bus buffer 43.

Responding to the test signal 104, the bus buffer 42 outputs its contents to the external bus read signal line 120. Also, the bus buffer 43 outputs its contents to respective bits $PD_0$~$PD_3$ of the port data bus 112.

The OR gate 44 takes an OR logic of the output mode signal ($P_1$OUT) 111 and the external access mode signal 122, and the result of the operation is outputted to the output buffer 39.

Figure 5:
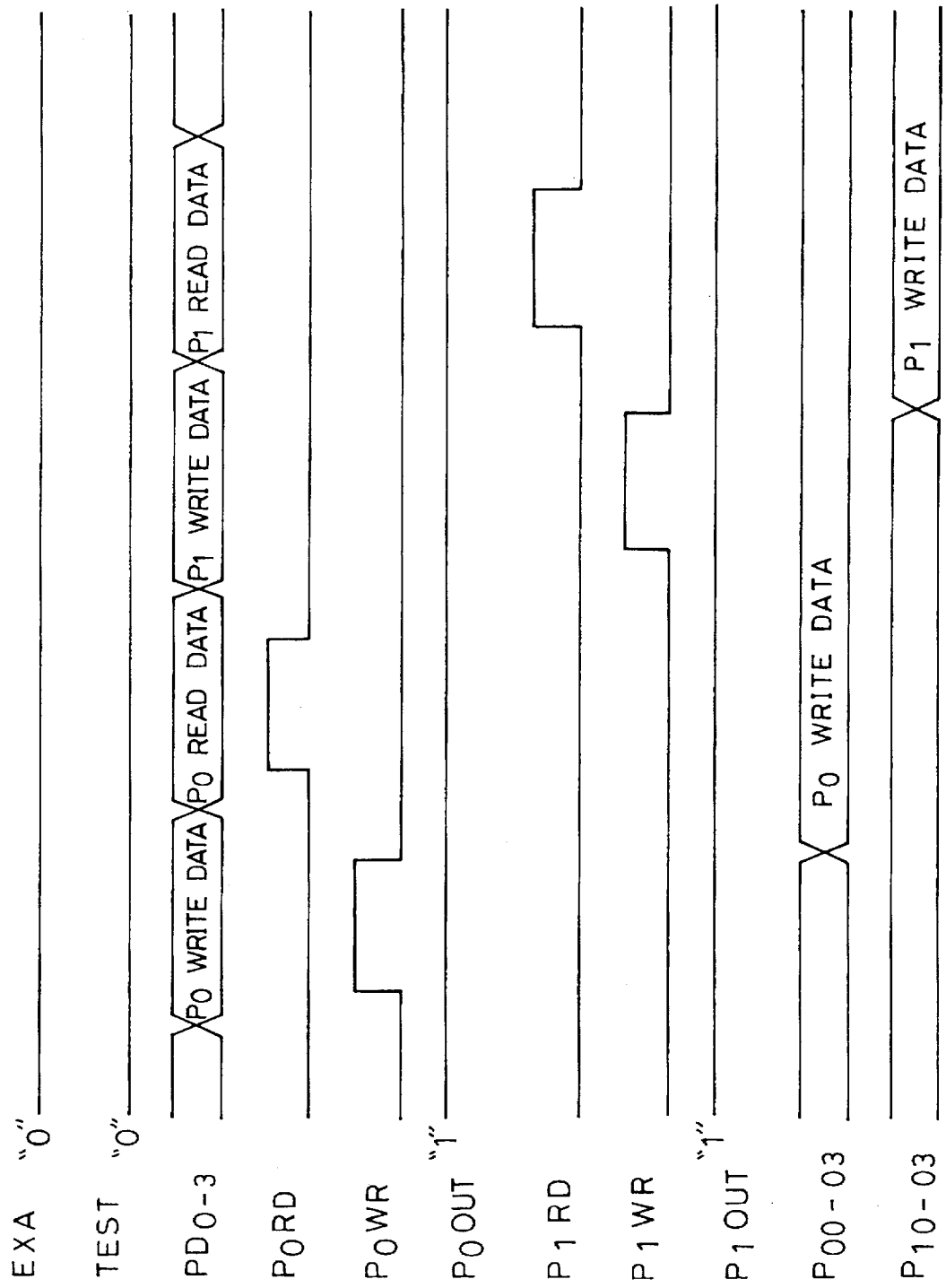
FIG. 5 is a timing chart showing the operation of the external bus I/F·port of FIG. 2 when used for a port.

FIG. 5 is a timing chart showing the operation which takes place when the external bus I/F·port 1 shown in FIG. 2 is used as a port. The operation thereof is now explained with reference to FIGS. 2–5.

When the port 0 is in an output mode, the microcomputer core 4 causes the output mode signal ($P_0$OUT) 111 to be "1". Also, in this case, since the mode is neither the external access mode nor the test mode, both the external access mode signal (EXA) 122 and the test signal (TEST) 104 become "0".

Here, the port 0 consists of 4 bits but these 4 bits are of the same configuration. So, the explanation is made only for the bit 0 ($P_{00}$) of the port 0.

When a data is written on the bit 0 of the port 0, the data is outputted to the port data bus ($PD_0$) 112 and the write signal ($P_0WR$) 115 of the port 0 becomes "1". Thus, the data in the port data bus ($PD_0$) 112 is written into the latch 15.

Subsequently, when the write signal ($P_0WR$) 115 of the port 0 becomes "0", the output of the latch 15 is written into the latch 16. At this time, since the external access mode signal (EXA) 122 is "0", the address strobe signal (AS) 121 becomes "0" and the output of the OR gate 30 also becomes "0".

As a result, the output 130 of the NOR gate 32 becomes "1" and the output signal of the latch 16 is outputted to the terminal 101$a$ through the AND gate 17, the OR gate 20 and the output buffer 21.

On the other hand, when a data is read out from the bit 0 of the port 0, since the read signal ($P_0RD$) 116 of the port 0 becomes "0", the data at the terminal 101$a$ is outputted to the port data bus ($PD_0$) 112 through the AND gate 22 and the bus buffer 24, and the data at the terminal 101$a$ is inputted to the microcomputer core 4. The data write and data read operation can be carried in the same way with bits 1~3 ($P_{01}$~$P_{03}$) of the port 0.

The bit 0 ($P_{10}$) of the port 1 undergoes the same operation process as above so that, in the case of data writing in the bit 0 of the port 1, if the write signal ($P_1WR$) 117 of the port 1 becomes "1" when the output mode signal ($P_1OUT$) 111 is "1", the data in the port data bus ($PD_0$) 112 is written into the latch 34.

Then, when the write signal ($P_1WR$) 117 of the port 1 becomes "0", the output of the latch 34 is written into the latch 35 and the output signal of the latch 35 is outputted to the terminal 102$a$ through the AND gate 36, the OR gate 38 and the output buffer 39.

Also, in the case of data read from the bit 0 of the port 1, the read signal ($P_1RD$) 118 of the port 1 becomes "1" and the data at the terminal 102$a$ is outputted to the port data bus ($PD_0$) 112 through the AND gate 41 and the bus buffer 43 and the data at the terminal 102$a$ is inputted to the microcomputer core 4. The bits 1~3 ($P_{11}$~$P_{13}$) of the port 1 undergo the same operation for writing and reading data.

Figure 6:
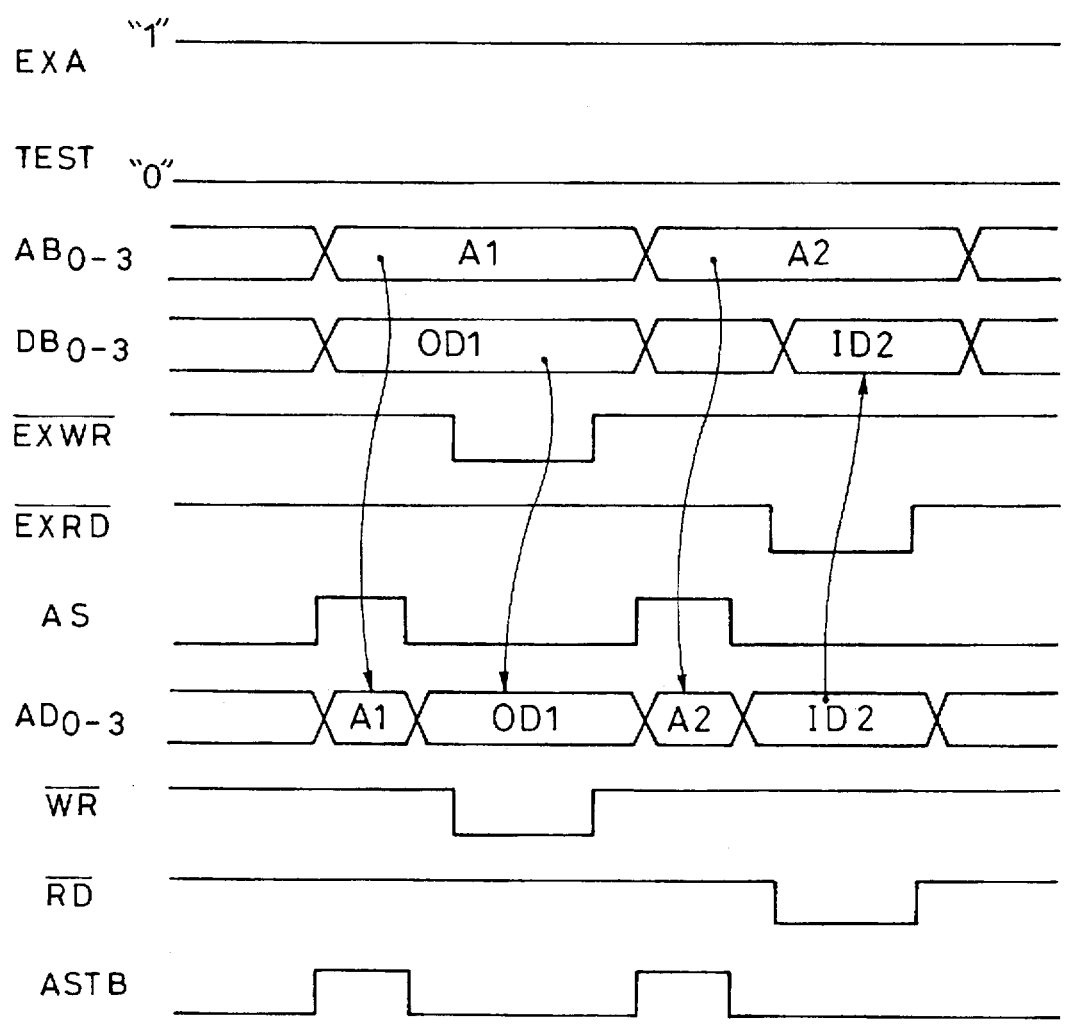
FIG. 6 is a timing chart showing the operation of the external bus I/F·port of FIG. 2 when used as an external bus interface.

FIG. 6 is a timing chart showing the operation of the external bus I/F·port 1 of FIG. 2 when used as the external bus interface. Now, with reference to FIGS. 2–4 and 6, the explanation is made for the operation of the external bus I/F·port 1 when used as the external bus interface.

During the external accessing, the external access mode signal (EXA) 122 becomes "1" and the test signal (TEST) 104 becomes "0". During the data writing, the microcomputer core 4 outputs the data "$OD_1$" to the external bus data bus ($DB_{0-3}$) 113 and the address "$A_1$" to the external bus address bus ($AB_{0-3}$) 114.

First, when the address strobe signal (AS) 121 is "1", the bit 0 of the address "A1" on the external bus address bus 114 is outputted to the terminal 101$a$ through the AND gate 19, the OR gate 20 and the output buffer 21. Similarly, other bits 1~3 of the address "$A_1$" are outputted to the terminals 101$b$~101$d$.

Next, when the address strobe signal 121 becomes "0", the AND gate 28 becomes "1", so that the bit 0 of the data "$OD_1$" on the external bus data bus 113 is outputted to the terminal 101$a$ through the AND gate 18, the OR gate 20 and the output buffer 21. Similarly, other bits 1~3 of the data "$OD_1$" are outputted to the terminals 101$b$~101$d$.

During the reading of the data from the external bus, when the address strobe signal 121 is "1", the bit 0 of the address "$A_2$" on the external bus address bus 114 is outputted from the terminal 101$a$. Similarly, other bits 1~3 of the address "$A_2$" are outputted from the terminals 101$b$~101$d$.

Next, when the external bus read signal (inversion signal of EXRD) 120 becomes "0", the output of the NOR gate 12 becomes "1", so that the bit 0 of the data "$ID_2$" on the terminal 101$a$ is outputted to the external bus data bus 113 through the AND gate 23 and the bus buffer 25 and the bit 0 of the data "$ID_2$" on the terminal 101$a$ is inputted to the microcomputer core 4. Similarly, other bits 1~3 of the data "$ID_2$" are inputted to the microcomputer core 4.

Figure 7:
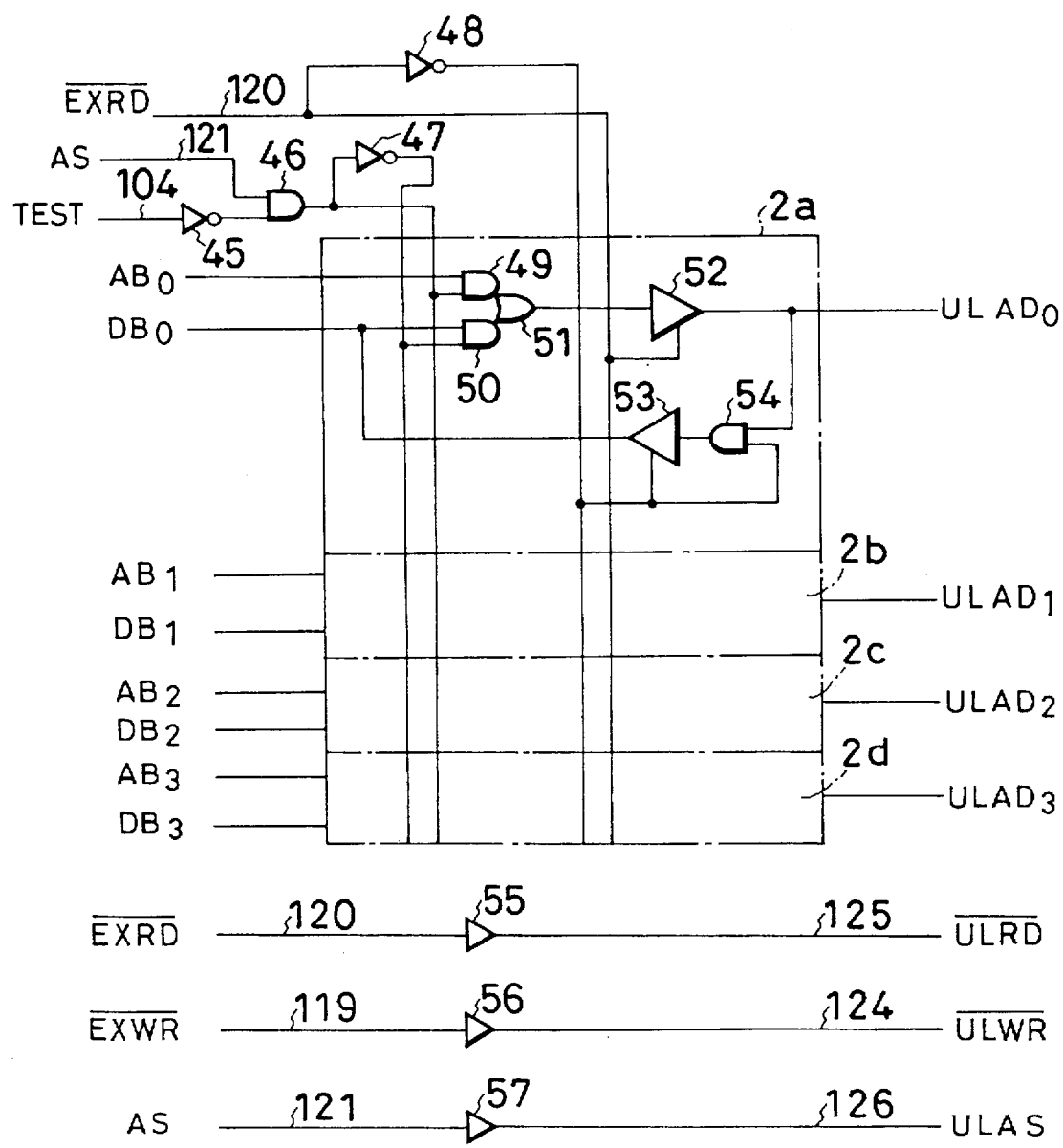
FIG. 7 is a diagram showing a configuration of the bus I/F shown in FIG. 2.

FIG. 7 is a diagram showing the arrangement of the bus I/F 2 shown in FIG. 2. Here, interface circuits (hereinafter referred to as "I/F circuits") 2$a$~2$d$ of the bus I/F 2 are provided in correspondence with respective bits $ULAD_0$~$ULAD_3$ of the user logic address data bus 123 and are respectively constituted by AND gates 49, 50 and 54, an OR gate 51, an output buffer 52 and a bus buffer 53.

The bus I/F 2 is equipped with an AND gate 46, inverters 45, 47 and 48 and output buffers 55~57.

The AND gate 46 takes an AND logic of the address strobe signal (AS) 121 and the test signal (TEST) 104 inverted by the inverter 45 and the result of the operation is outputted to the inverter 47 and each AND gate 49 of the I/F circuits 2$a$~2$d$.

Each AND gate 49 of the I/F circuits 2$a$~2$d$ takes an AND logic of each of bits $AB_0$~$AB_3$ of the external bus address bus 114 and the output of the AND gate 46, and the result of the operation is outputted to the OR gate 51.

The AND gate 50 takes an AND logic of each of bits $DB_0$~$DB_3$ of the external bus data bus 113 and the output of the AND gate 46 inverted by the inverter 47, and the result of the operation is outputted to the OR gate 51.

The OR gate 51 takes an OR logic of the outputs of the AND gates 49 and 50 and the result of the operation is outputted to the output buffer 52. The output buffer 52 responds to the external bus read signal (inversion signal of EXRD) 120 and outputs its contents to respective bits $ULAD_0$~$ULAD_3$ of the user logic address data bus 123.

The AND gate 54 takes an AND logic of each of bits $ULAD_0$~$ULAD_3$ of the user logic address data bus 123 and the external bus read signal 120 inverted by the inverter 48, and the result of the operation is outputted to the output buffer 53.

The output buffer 53 responds to the external bus read signal 120 inverted by the inverter 48 and outputs its contents to respective bits $DB_0$~$DB_3$ of the external bus data bus 113.

The output buffer 55 outputs the user logic read signal (inversion signal of ULRD) 125 to the external bus read signal line 120. The output buffer 56 outputs the user logic write signal (inversion signal of ULWR) 124 to the external bus write signal line (inversion signal of EXWR) 119. The output buffer 57 outputs the address strobe signal 121 to the user logic address strobe signal line (ULAS) 126.

Figure 8:
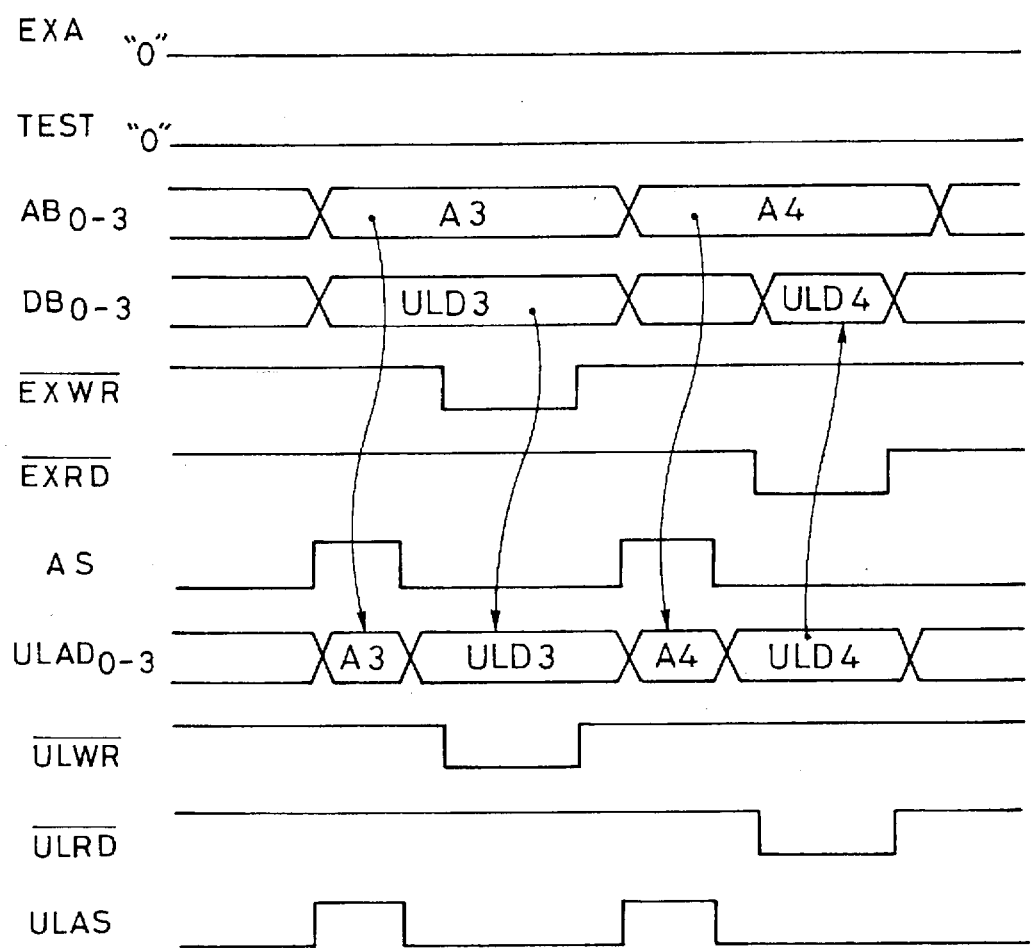
FIG. 8 is a timing chart showing access timings of a user logic unit by the single-chip microcomputer core shown in FIG. 2.

FIG. 8 is a timing chart showing access timings of a user logic unit 3 by the single-chip microcomputer core 4 shown in FIG. 2. With reference to FIG. 8 and also to FIGS. 2 and 7, the access operation of the user logic unit 3 by the single-chip microcomputer core 4 is hereinafter explained.

When the user logic unit 3 is accessed, the external access mode signal (EXA) 122 and the test signal (TEST) 104 become "0". At this time, the external bus I/F·port 1 does not operate because the external access mode signal 122 is "0".

During the data writing to the user logic unit 3, as the external bus write signal (inversion signal of EXWR) 119 becomes "0", the user logic write signal (inversion signal of ULWR) 124 becomes "0". At this time, the address "A3", the data "ULD$_3$", the write signal, and the address strobe signal are outputted to the user logic unit 3.

When the address strobe signal (AS) 121 becomes "1" and the user logic address strobe signal (ULAS) 126 becomes "1", each of bits AB$_0$~AB$_3$ of the address "A$_3$" on the external bus address bus 114 is outputted to a corresponding one of the bits ULAD$_0$~ULAD$_3$ of the user logic address data bus 123 through the AND gate 49, the OR gate 51 and the output buffer 52 of each of the I/F circuits 2a~2d.

Next, when the address strobe signal 121 becomes "0", each of bits DB$_0$~DB$_3$ of the data "ULD$_3$" on the external bus data bus 113 on the external bus data bus 113 is outputted to a corresponding one of the bits ULAD$_0$~ULAD$_3$ of the user logic address data bus 123 through the AND gate 50, the OR gate 51 and the output buffer 52 of each of the I/F circuits 2a~2d. Thus, the data "ULD$_3$" is written into the address "A$_3$" of the user logic unit 3.

During the reading of the data from the user logic unit 3, when the address strobe signal 121 becomes "1" and the user logic address strobe signal 126 becomes "1", each of bits AB$_0$~AB$_3$ of the address "A$_4$" on the external bus address bus 114 is outputted to a corresponding one of the bits ULAD$_0$~ULAD$_3$ of the user logic address data bus 123 through the AND gate 49, the OR gate 51 and the output buffer 52 of each of the I/F circuits 2a~2d.

After the address strobe signal 121 has become "1", when the external bus read signal (inversion signal of EXRD) 120 becomes "0", the user logic read signal (inversion signal of ULRD) 125 becomes "0" and the data "ULD$_4$" read from the address "A$_4$" of the user logic unit 3 is outputted to the user logic address data bus 123.

Since the external bus read signal 120 is "0", each of bits ULAD$_0$~ULAD$_4$ of the data "ULD$_4$" on the user logic address data bus 123 is outputted to each of bits DB$_0$~DB$_3$ of the external bus data bus 113 through the AND gate 54 and the bus buffer 53, and the data "ULD$_4$" of the user logic unit 3 is outputted to the microcomputer core 4.

Generally, unlike the internal bus, the external bus is for connecting various peripheral elements such as peripheral LSIs to the exterior, so that the timings of the bus signal are regulated by the standards in which the ability to connect such times as the set-up time and hold time is sufficiently considered.

When the above standards are observed, it becomes possible to make connections with circuits having a variety of functions and operation timings. In this case, the signals outputted to external circuits are constituted only by the read signal, the write signal, and the address strobe signal of the address data bus.

The user logic unit 3 requires the read/write circuit to be connected to the bus signal but the circuit can be designed easily with a small number of access signals. Also, since the external bus is an asynchronous bus without clock functions, the user logic unit 3 is able to operate completely independently of the operation timings of the microcomputer core 4.

Figure 9:
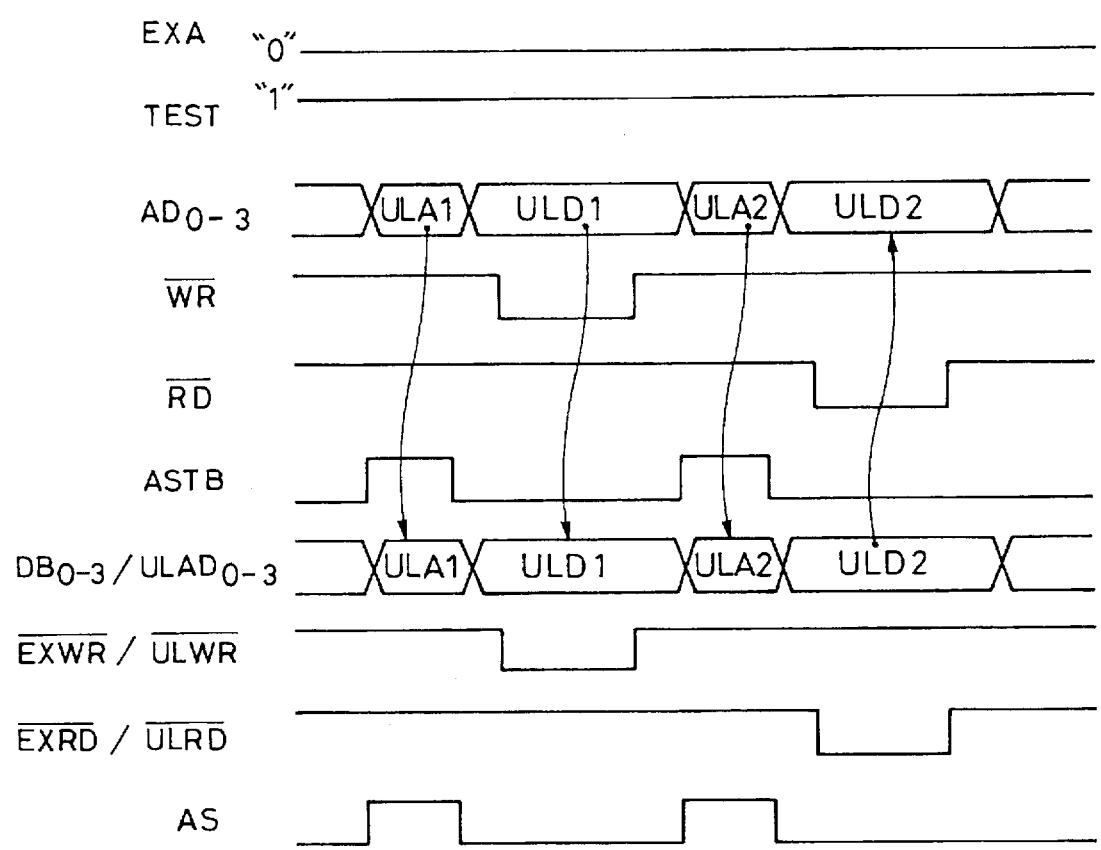
FIG. 9 is a timing chart showing access timings during the testing of the user logic unit shown in FIG. 2.

FIG. 9 is a timing chart showing access timings during the testing of the user logic unit 3 shown in FIG. 2. With reference to FIG. 9 as well as FIGS. 2 and 7, the access operation of the user logic unit 3 during the testing thereof is explained.

During the testing of the user logic unit 3, the user logic unit 3 is directly accessed from the exterior by externally inputting ASTB, AD$_{0-3}$, inversion signal of WR and inversion signal of RD. That is, in this first embodiment of the invention, the arrangement is such that the user logic unit 3 as a unit is accessed and tested.

During the testing of the user logic unit 3, the test signal (TEST) 104 which is inputted from the terminal 6 is "1". The microcomputer 4, when the test signal 104 becomes "1", is separated from the external bus data bus (DB$_{0-3}$) 113, the external bus address bus (AB$_{0-3}$) 114, the external bus write signal (inversion signal of EXWR) 119, the external bus read signal (inversion signal of EXRD) 120, and the address signal (AS) 121, all lying between the microcomputer core 4 and the external bus I/F port 1.

To access user logic unit 3, the externally inputted ASTB, AD$_{0-3}$, inversion signal of WR and inversion signal of RD are supplied, through the external bus I/F·port 1, to the external bus data bus 113, the external bus address bus 114, the external bus write signal 119, the external bus read signal 120 and the address strobe signal 121, respectively.

During the writing of the data to the user logic unit 3 from the exterior, since the external bus write signal 119 becomes "0", the user logic write signal (inversion signal of ULWR) 124 becomes "0". At this time, the user logic unit 3 receives the outputs of the address "ULA$_1$", the data "ULD$_1$", the write signal and the address strobe signal.

When the address strobe signal (AS) 121 becomes "1" and the user logic address strobe signal (ULAS) 126 becomes "1", each of bits AB$_0$–AB$_3$ of the address "ULA" on the external bus address bus 114 is outputted to each of bits ULAD$_0$~ULAD$_3$ of the user logic address data bus 123 through the AND gate 49, the OR gate 51 and output buffer 52 of each of the I/F circuits 2a~2d.

Next, when the address strobe signal 121 becomes "0", each of bits DB$_0$~DB$_3$ of the data "ULD$_1$" on the external bus data bus 113 is outputted to each of bits ULAD$_0$~ULAD$_3$ of the user logic address data bus 123 through the AND gate 50, the OR gate 51 and the output buffer 52 of each of the I/F circuits 2a~2d. In this way, the data "ULD$_1$" is written into the address "ULA$_1$" of the user logic unit 3.

Also, during the reading of the data to the exterior from the user logic unit 3, when the address strobe signal 121 becomes "1" and the user logic address strobe signal 126 becomes "1", each of bits AB$_0$~AB$_3$ of the address "ULA$_2$" on the external bus address bus 114 is outputted to a corresponding one of the bits ULAD$_0$~ULAD$_3$ of the user logic address data bus 123 through the AND gate 49, the OR gate 51 and the output buffer 52 of each of the I/F circuits 2a~2d.

After the address strobe signal 121 has become "1", when the external bus read signal 120 becomes "0", the user logic read signal (inversion signal of ULRD) 125 becomes "0" and the data "ULD$_2$" read from the address "ULA$_2$" of the user logic unit 3 is outputted to the user logic address data bus 123.

Since the external bus read signal 120 is "0", each of bits ULAD$_0$~ULAD$_4$ of the data "ULD$_2$" on the user logic address data bus 123 is outputted to each of bits DB$_0$~DB$_3$ of the external bus data bus 113 through the AND gate 54 and the bus buffer 53, and the data "ULD$_4$" of the user logic unit 3 is outputted externally through the external bus I/F·port 1.

The user logic unit 3 is designed by a user, and the test pattern prepared for testing the user logic unit 3 as a unit is used for the testing.

Since the single-chip microcomputer 5 in which the user logic is built in is accessed externally as a unit, it is possible to carry out the necessary testing by using the aforementioned test pattern and, as a result, it is unnecessary to design a separate test pattern for purposes of testing the user logic unit 3.

Figure 10:
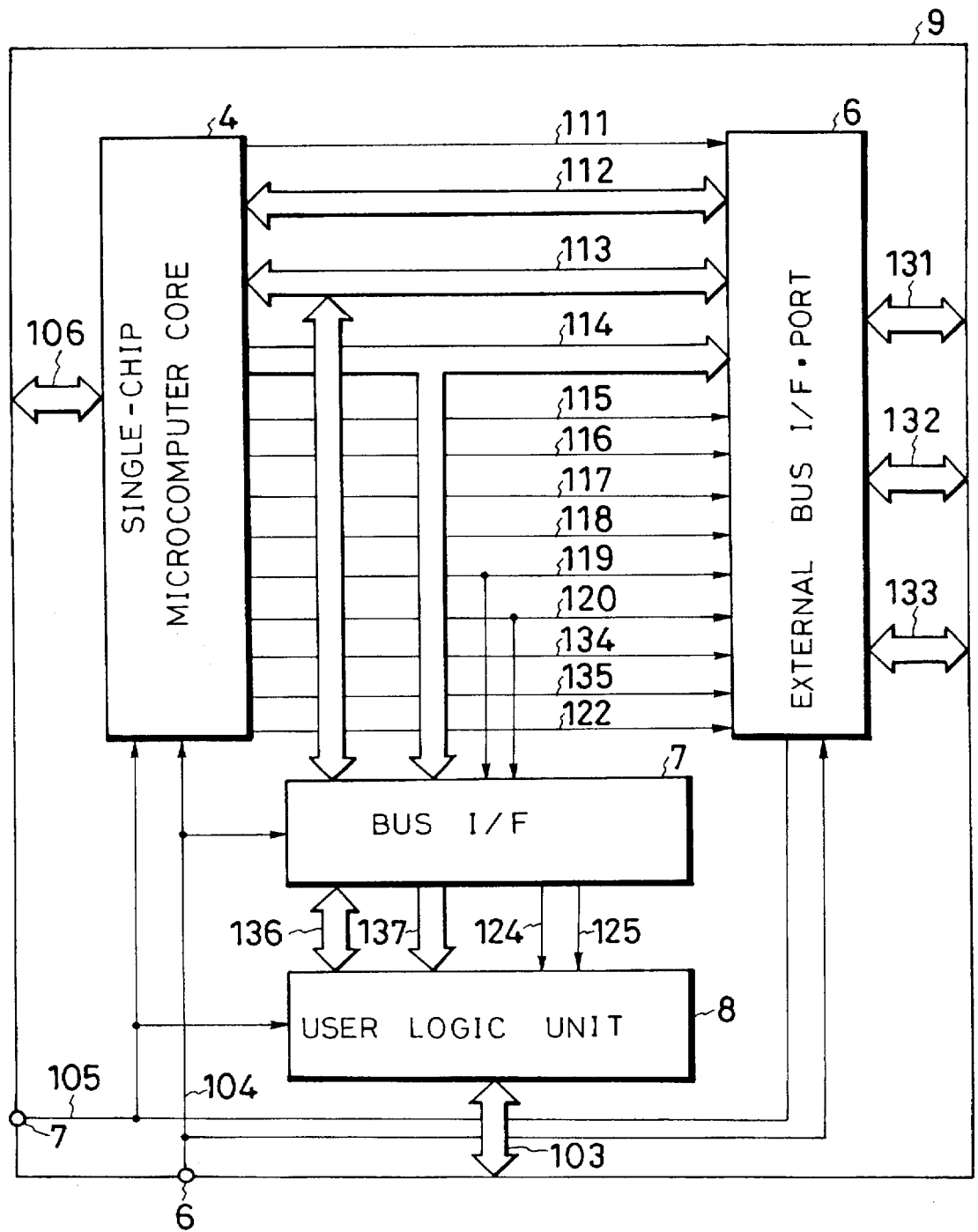
FIG. 10 is a block diagram showing a configuration of a single-chip microcomputer of a second embodiment according to the invention.

FIG. 10 is a block diagram showing an arrangement in the second embodiment of the invention. Here, the arrangement in this embodiment is the same as that in the first embodiment shown in FIG. 2 except for the points wherein the external bus I/F·port 6 is connected to the data bus ($P_{00-03}$/$D_{0-3}$) 131, the control bus (inversion signal of $P_{10-13}$/RD, inversion signal of WR) 132 and the address bus ($P_{20-23}$/$A_{0-3}$) 133 and wherein the bus I/F 7 is connected to the user logic unit 8 by the user logic data bus (ULDB$_{0-3}$) 136, the user logic address bus (ULAB$_{0-3}$) 137, the user logic read signal line (inversion signal of ULRD) 125 and the user logic write signal line (inversion signal of ULWR) 124. The same reference numerals and symbols are used for the same or similar elements. It is to be understood that the same elements function in the same way in this and in the first embodiment.

Figure 11:
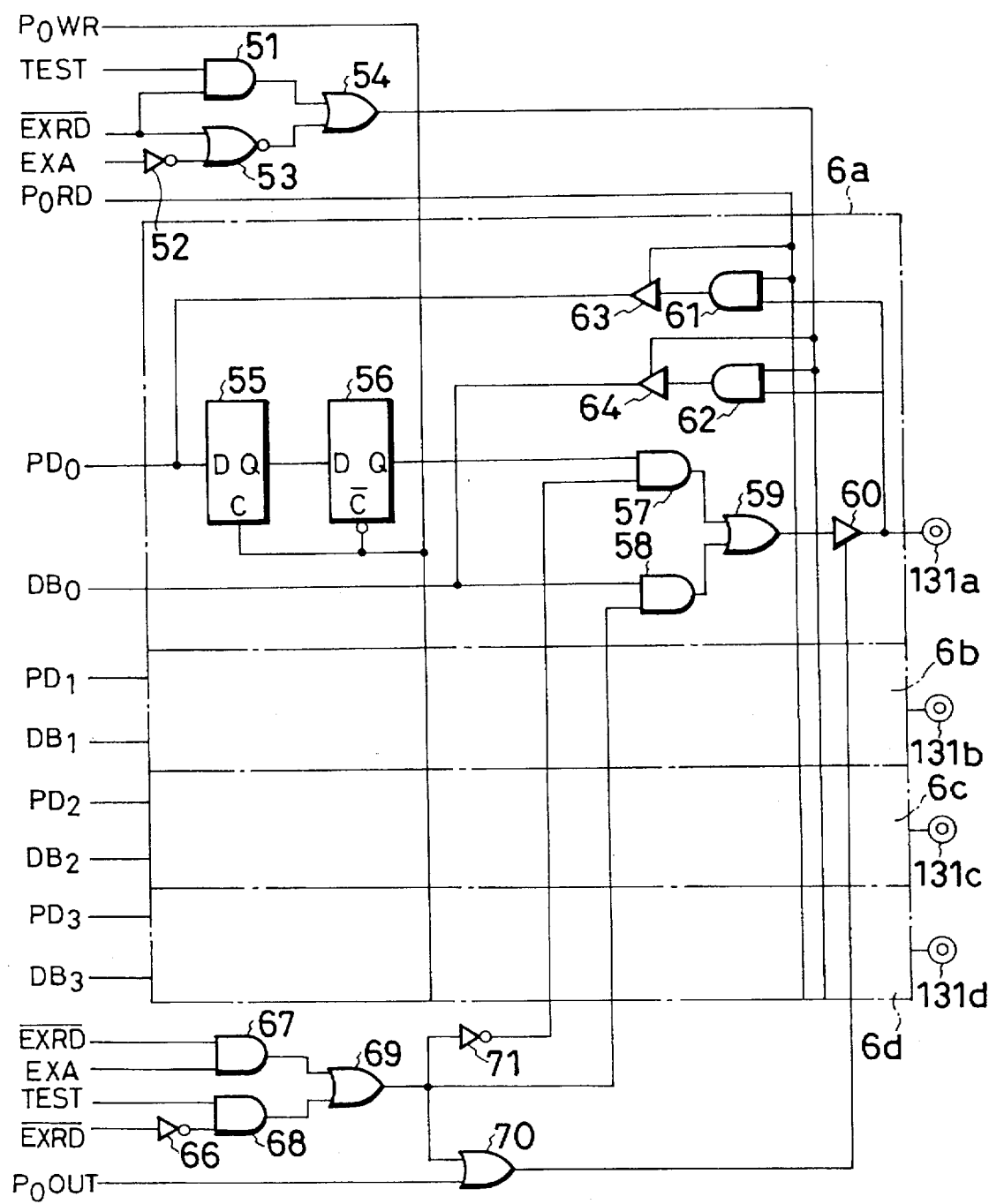
FIG. 11 is a diagram showing a configuration of the external bus I/F·port (connected to a data bus) shown in FIG. 10.
Figure 12:
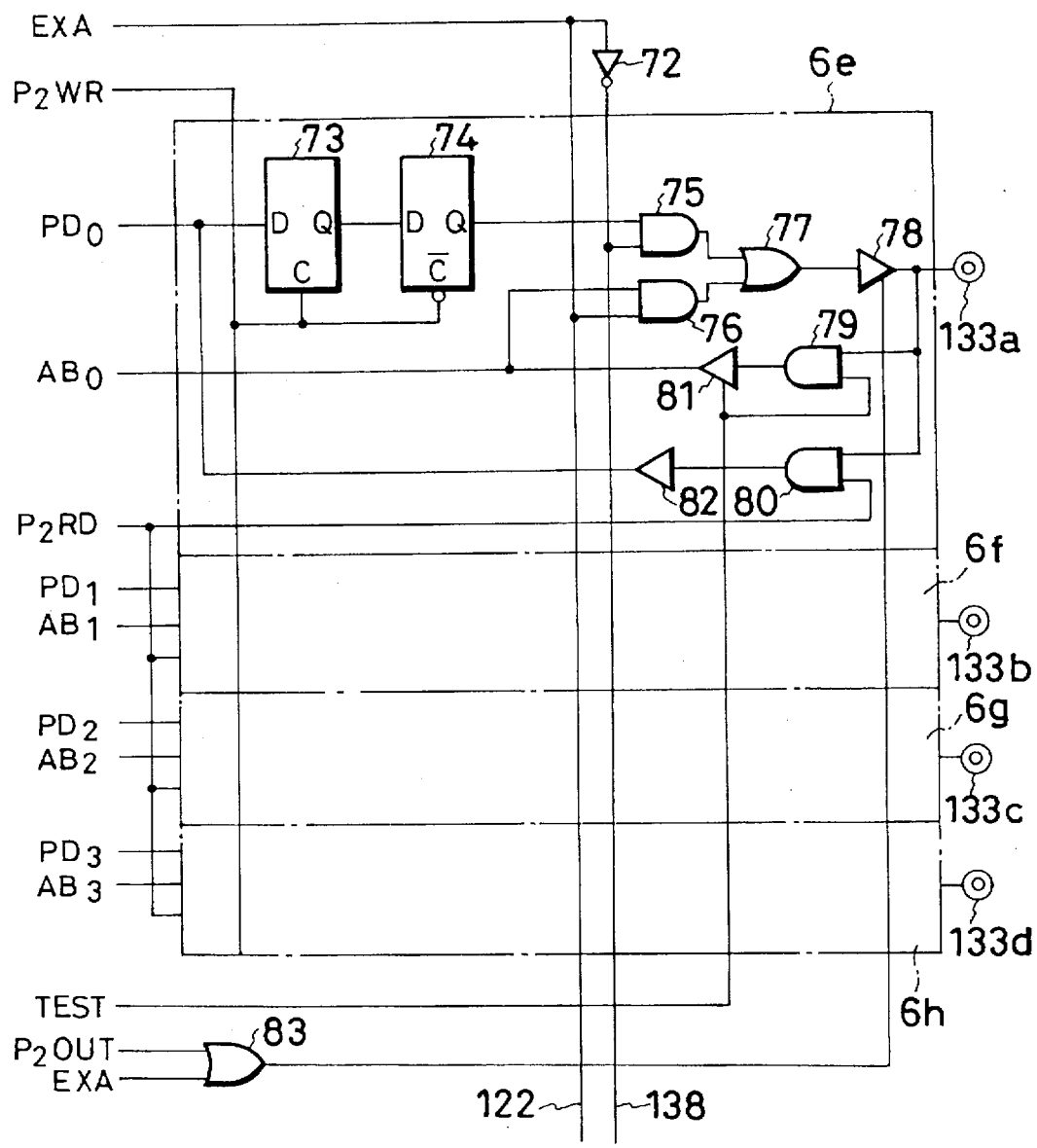
FIG. 12 is a diagram showing a configuration of the external bus I/F·port (connected to an address bus) shown in FIG. 10.
Figure 13:
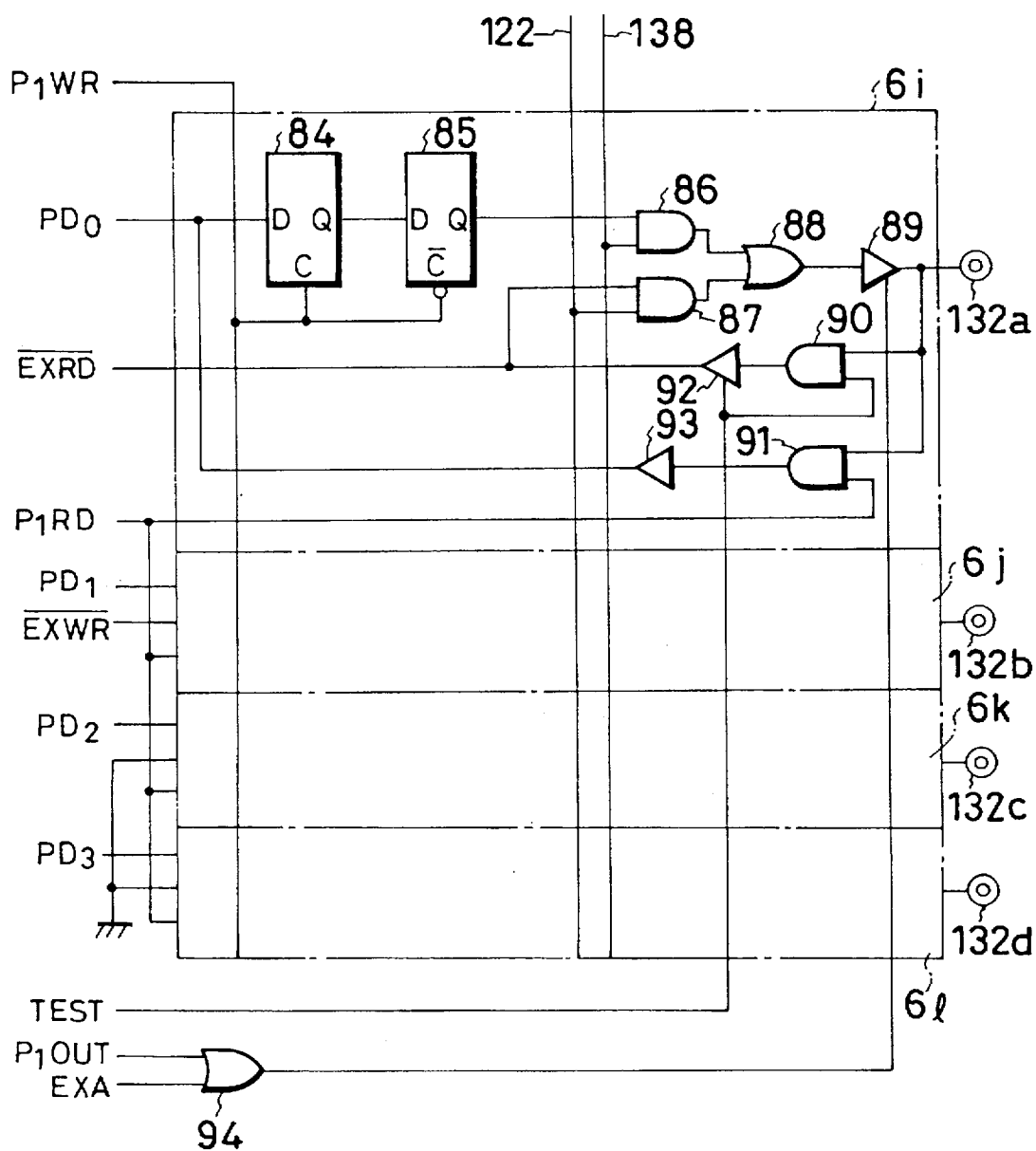
FIG. 13 is a diagram showing a configuration of the external bus I/F·port (connected to a control bus) shown in FIG. 10.

FIGS. 11–13 are diagrams showing an arrangement in the external bus I/F·port 6 shown in FIG. 10. FIG. 11 shows an arrangement at the side which is connected to the data bus 131 of the external bus I/F·port 6, while FIG. 12 shows the side which is connected to the address bus 133 of the external bus I/F·port 6. FIG. 13 shows the side which is connected to the control bus 132 of the external bus I/F·port 6.

Interface circuits (hereinafter referred to as "I/F circuits") 6a~6d of the external bus I/F·port 6 are provided so as to correspond to the respective bits ($P_{00}$–$P_{03}$/$D_0$–$D_3$), and each of such circuits comprises latches 55 and 56, AND gates 57, 58, 61 and 62, an OR gate 59, an output buffer 60, and bus buffers 63 and 64.

Also, at the side where the external bus I/F·port 6 is connected to the data bus 131, there are AND gates 51, 67 and 68, a NOR gate 53, OR gates 54, 69 and 70, and inverters 52, 66 and 71.

The AND gate 51 takes an AND logic of the test signal (TEST) 104 and the external bus read signal (inversion signal of EXRD) 120, and the result of the operation is outputted to the OR gate 54. The NOR gate 53 takes a NOR logic of the external bus read signal 120 and an external access mode signal (EXA) 122 inverted by the inverter 52, and the result of the operation is outputted to the OR gate 54.

The OR gate 54 takes an OR logic of the AND gate 51 and the output of the NOR gate 53, and the result of the operation is outputted to each AND gate 62 of the I/F circuits 6a~6d and to the bus buffer 64.

Each latch 55 of the I/F circuits 6a~6d latches each of bits $PD_0$~$PD_3$ of the port data bus 112 in response to the write signal ($P_0$WR) 115 of the port 0, and its value is outputted to the latch 56. The latch 56 latches the output of the latch 55 in response to the inverted value of the write signal ($P_0$WR) 115 of the port 0 and outputs its value to the AND gate 57.

The AND gate 57 takes an AND logic of the output of the latch 56 and the output of the OR gate 69 inverted by the inverter 71, and the result of the operation is outputted to the OR gate 59. The OR gate 58 takes an AND logic of each of bits $DB_0$~$DB_3$ of the external bus data bus 113 and the output of the OR gate 69, and the result of the operation is outputted to the OR gate 59.

The OR gate 59 takes an OR logic of outputs of the AND gates 57 and 58, and the result of the operation is outputted to the output buffer 60. Responding to the output of the OR gate 70, the output buffer 60 outputs its contents to the terminals 131a~131d corresponding to respective bits ($P_{00}$~$P_{03}$/$D_0$~$AD_3$) of the address data bus 131.

The AND gate 61 takes an AND logic of the read signal ($P_0$RD) 116 of the port 0 and the output of the terminals 131a~131d, and the result of the operation is outputted to the bus buffer 63. The AND gate 62 takes an AND logic of the output of the OR gate 54 and the output of the terminals 131a~131d, and the result of the operation is outputted to the bus buffer 64.

Responding to the read signal ($P_0$RD) 116 of the port 0, the bus buffer 63 outputs its contents to respective bits $PD_0$~$PD_3$ of the port data bus 112. Also, responding to the OR gate 54, the bus buffer 64 outputs its contents to respective bits $DB_0$~$DB_3$ of the external bus data bus 113.

The AND gate 67 takes an AND logic of the external bus read signal 120 and the external access mode signal 122, and the result of the operation is outputted to the OR gate 69.

The AND gate 68 takes an AND logic of the test signal 104 and the external bus read signal 120 inverted by the inverter 66, and the result of the operation is outputted to the OR gate 69.

The OR gate 69 takes an OR logic of the outputs of the AND gates 67 and 68, and the result of the operation is outputted to the AND gate 58, the OR gate 70 and the inverter 71. The OR gate 70 takes an OR logic of the output of the OR gate 69 and the output mode signal ($P_0$OUT) 111, and the result of the operation is outputted to the output buffer 60.

The I/F circuits 6e~6h of the external bus I/F·port 6 are provided so as to correspond to the respective bits ($P_{20}$~$P_{23}$/AB$_{0-3}$) of the address bus 132, and each circuit comprises latches 73 and 74, AND gates 75, 76, 79 and 80, an OR gate 77, an output buffer 78, and bus buffers 81 and 82.

Also, on the side where the external bus I/F·port 6 is connected to the address bus 133, there are an inverter 72 and an OR gate 83. The inverter 72 inverts the external access mode signals 122 and outputs to respective I/F circuits 6e~6h and to the side where the external bus I/F·port 6 is connected to the control bus 132.

Each latch 73 of the I/F circuits 6e~6e latches each of bits $PD_0$~$PD_3$ of the port data bus 112 in response to the write signal of the port 2 ($P_2$WR) 134, and its value is outputted to the latch 74. The latch 74 latches the output of the latch 73 in response to the inverted value of the write signal ($P_2$WR) 134 of the port 2 and outputs its value to the AND gate 75.

The AND gate 75 takes an AND logic of the output of the latch 74 and the external access mode signal 122 inverted by the inverter 71, and the result of the operation is outputted to the OR gate 77. The AND gate 76 takes an AND logic of each of bits $AB_0$~$AB_3$ of the external bus address bus 114 and the external access mode signal 122, and the result of the operation is outputted to the OR gate 77.

The OR gate 77 takes an OR logic of the outputs of the AND gates 75 and 76, and the result of the operation is outputted to the output buffer 78. Responding to the output of the OR gate 83, the output buffer 78 outputs its contents to the terminals 133a~133d corresponding to respective bits ($P_{20}$~$P_{23}$/AB$_{0-3}$) of the address bus 133.

The AND gate 79 takes an AND logic of the output of the terminals 133a~133d and the test signal 104, and the result of the operation is outputted to the bus buffer 81. The AND gate 80 takes an AND logic of the output of the terminals 133a~133d and the read signal ($P_2$RD) 135 of the port 2, and the result of the operation is outputted to the bus buffer 82.

Responding to the test signal 104, the bus buffer 81 outputs its contents to each of bits $AB_0$~$AB_3$ of the external bus address bus 114. Also, the bus buffer 82 outputs its contents to each of bits $PD_0$~$PD_3$ of the port data bus 112.

The OR gate 83 takes an OR logic of the output mode signal ($P_2OUT$) 111 and the external access mode signal 122, and the result of the operation is outputted to the output buffer 78.

The I/F circuits 6i~6l of the external bus I/F·port 6 are provided so as to correspond to the respective bits (inversion signal of $P_{10}$~$P_{13}$/RD, inversion signal of WR) of the control bus 102, and each circuit comprises latches 84 and 85, AND gates 86, 87, 90 and 91, an OR gate 88, an output buffer 89, and bus buffers 92 and 93.

Also, at the side where the external bus I/F·port 6 is connected to the control bus 132, there is an OR gate 94.

Each latch 84 of the I/F circuits 6i~6l latches each of bits $PD_0$~$PD_3$ of the port data bus 112 in response to the write signal ($P_1WR$) 117 of the port 1, and its value is outputted to the latch 85. The latch 85 latches the output of the latch 84 in response to the inverted value of the write signal ($P_1WR$) 117 of the port 1 and outputs its value to the AND gate 86.

The AND gate 86 takes an AND logic of the output of the latch 85 and the inverted signal 138 from the inverter 72, and the result of the operation is outputted to the OR gate 88. The AND gate 87 takes an AND logic of the external bus read signal 120, the external bus write signal 119 and the external access mode signal 122, and the result of the operation is outputted to the OR gate 88.

The OR gate 88 takes an OR logic of the outputs of the AND gates 86 and 87, and the result of the operation is outputted to the output buffer 89. Responding to the output of the OR gate 94, the output buffer 89 outputs its contents to the terminals 132a~132d corresponding to respective bits (inversion signal of $P_{10}$~$P_{13}$/RD, inversion signal of WR) of the control bus 132.

The AND gate 90 takes an AND logic of the output of the terminals 132a~132d and the test signal 104, and the result of the operation is outputted to the bus buffer 92. The AND gate 91 takes an AND logic of the output of the terminals 132a~132d and the read signal ($P_1RD$) 118 of the port 1, and the result of the operation is outputted to the bus buffer 93.

Responding to the test signal 104, the bus buffer 92 outputs its contents to the external bus read signal 120. Also, the bus buffer 93 outputs its contents to respective bits $PD_0$~$PD_3$ of the port data bus 112.

The OR gate 94 takes an OR logic of the output mode signal ($P_1OUT$) 111 and the external access mode signal 122, and the result of the operation is outputted to the output buffer 89.

Figure 14:
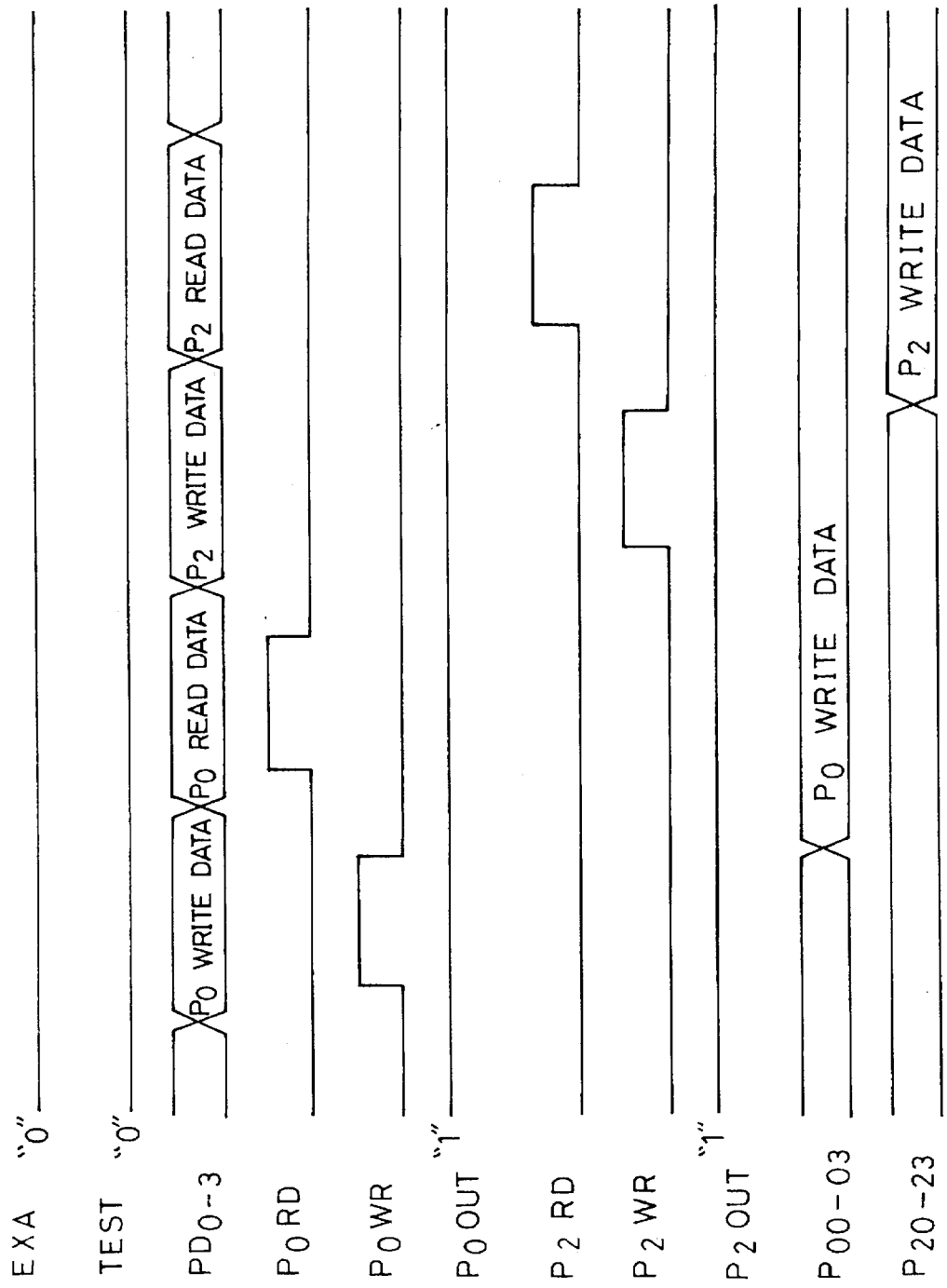
FIG. 14 is a timing chart showing the operation which takes place when the external bus I/F·port shown in FIG. 10 is used for a port.

FIG. 14 is a timing chart showing the operation which takes place when the external bus I/F·port 6 shown in FIG. 10 is used for ports. The operation thereof is now explained with reference to FIGS. 10–14.

When the port 0 is in an output mode, the microcomputer core 4 causes the output mode signal ($P_0OUT$) 111 to be "1". Also, in this case, since the mode is neither the external access mode nor the test mode, both the external access mode signal (EXA) 122 and the test mode signal (TEST) 104 become "0".

Here, the port 4 consists of 4 bits but these 4 bits are of the same configuration. So, the explanation is made only for the bit 0 ($P_{00}$) of the port.

When a data is written on the bit 0 of the port 0, the data is outputted to the port data bus ($PD_0$) 112 and the write signal ($P_0WR$) 115 of the port 0 becomes "1". Thus, the data in the port data bus ($PD_0$) 112 is written into the latch 55.

Subsequently, when the write signal ($P_0WR$) 115 of the port 0 becomes "0", the output of the latch 55 is written into the latch 56. At this time, since the external access mode signal 122 is "0", the output of the OR gate 69 also becomes "0".

As a result, the output of the inverter 71 becomes "1" and the output signal of the latch 56 is outputted to the terminal 131a through the AND gate 57, the OR gate 59 and the output buffer 60.

On the other hand, when a data is read out from the bit 0 of the port 0, since the read signal ($P_0RD$) 116 of the port 0 becomes "1", the data at the terminal 131a is outputted to the port data bus ($PD_0$) 112 through the AND gate 61 and the bus buffer 63, and the data at the terminal 131a is inputted to the microcomputer core 4. The data write and data read operation can be carried in the same way with bits 1~3 ($P_{01}$~$P_{03}$) of the port 0.

The bit 0 ($P_{10}$) of the port 1 undergoes the same operation process as above so that, in the case of data writing in the bit 0 of the port 1, if the write signal ($P_1WR$) 117 of the port 1 becomes "1" when the output mode signal ($P_1OUT$) 111 is "1", the data in the port data bus ($PD_0$) 112 is written into the latch 84.

Then, when the write signal ($P_1WR$) 117 of the port 1 becomes "0", the output of the latch 84 is written into the latch 85 and the output signal of the latch 85 is outputted to the terminal 132a through the AND gate 86, the OR gate 88 and the output buffer 89.

Also, in the case of data read from the bit 0 of the port 1, the read signal ($P_1RD$) 118 of the port 1 becomes "1" and the data at the terminal 132a is outputted to the port data bus ($PD_0$) 112 through the AND gate 91 and the bus buffer 93 and the data at the terminal 132a is inputted to the microcomputer core 4. The bits 1~3 ($P_{11}$~$P_{13}$) of the port 1 undergo the same operation for writing and reading data.

The bit 0 ($P_{20}$) of the port 2 undergoes the same operation process as above so that, in the case of data writing in the bit 0 of the port 2, if the write signal ($P_2WR$) 134 of the port 2 becomes "1" when the output mode signal ($P_2OUT$) 111 is "1", the data in the port data bus ($PD_0$) 112 is written into the latch 73.

Then, when the write signal ($P_2WR$) 134 of the port 2 becomes "0", the output of the latch 73 is written into the latch 74 and the output signal of the latch 74 is outputted to the terminal 133a through the AND gate 75, the OR gate 77 and the output buffer 78.

Also, in the case of data read from the bit 0 of the port 2, the read signal ($P_2RD$) 118 of the port 2 becomes "1" and the data at the terminal 133a is outputted to the port data bus ($PD_0$) 112 through the AND gate 80 and the bus buffer 82 and the data at the terminal 133a is inputted to the microcomputer core 4. The bits 1~3 ($P_{21}$~$P_{23}$) of the port 2 undergo the same operation for writing and reading data.

Figure 15:
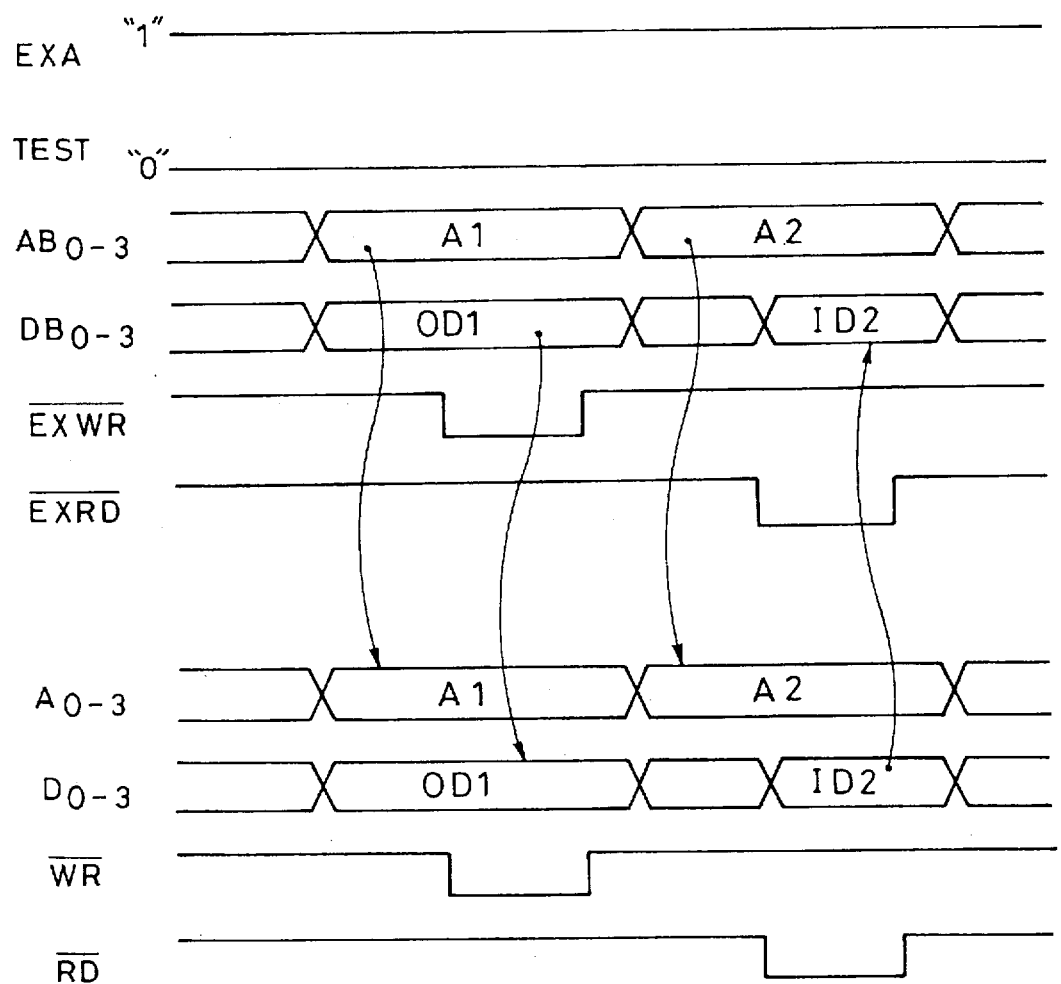
FIG. 15 is a timing chart showing the operation of the external bus I/F·port of FIG. 10 when used as an external bus interface.

FIG. 15 is a timing chart showing the operation of the external bus I/F·port 6 of FIG. 10 when used as the external bus interface. Now, with reference to FIGS. 10–13 and 15, the explanation is made for the operation of the external bus I/F·port 6 when used as the external bus interface.

During the external accessing, the external access mode signal (EXA) 122 becomes "1" and the test signal (TEST) 104 becomes "0". During the data writing, the microcomputer core 4 outputs the data "$OD_1$" to the external bus data bus ($DB_{0-3}$) 113 and the address "$A_1$" to the external bus address bus ($AB_{0-3}$) 114.

First, when the external access mode signal 122 becomes "1", each bit of the address "A$_1$" on the external bus address bus 114 is outputted to the terminals 133a~133d through the AND gate 76, the OR gate 77 and the output buffer 78 of each of I/F circuits 6e~6h.

Under the above state, since the external bus read signal (inversion value of EXRD) 120 is "1", the AND gate 67 becomes "1" and the OR gate 69 becomes "1". Thus, the bit 0 of the data "OD$_1$" on the external bus data bus 113 is outputted to the terminals 131a~131d through the AND gate 58, the OR gate 59 and the output buffer 60 of each of I/F circuits 6a~6d.

During the reading of the data from the external bus, since the external access mode signal 122 becomes "1", each of bits of the address "A$_2$" on the external bus address bus 114 is outputted to the terminals 133a~133d.

Next, when the external bus read signal 120 becomes "0", the output of the NOR gate 53 becomes "1", so that each bit of the data "ID$_2$" on the terminals 131a~131d is outputted to the external bus data bus 113 through the AND gate 62 and the bus buffer 64, and the data "ID$_2$" on the terminals 131a~131d is inputted to the microcomputer core 4.

Figure 16:
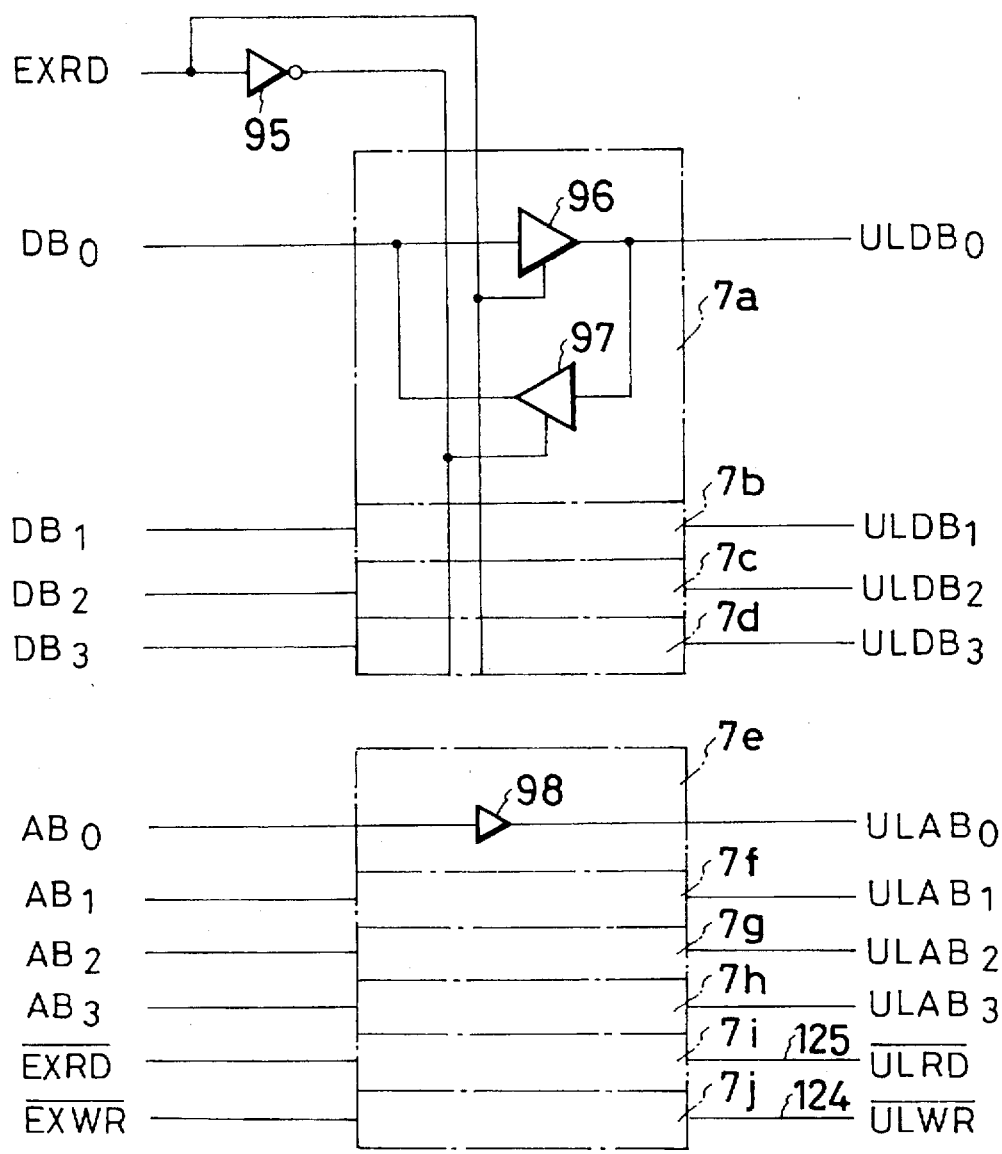
FIG. 16 is a diagram showing a configuration of the bus I/F shown in FIG. 10.

FIG. 16 is a diagram showing the arrangement of the bus I/F 7 shown in FIG. 10. Here, interface circuits (hereinafter referred to as "I/F circuits") 7a~7d of the bus I/F 7 are provided in correspondence with respective bits ULDB$_0$~ULDB$_3$ of the user logic data bus 136 and are respectively constituted by an output buffer 96 and a bus buffer 97.

The I/F 7 circuits 7e~7j of the bus I/F 7 are provided so as to correspond to the respective bits ULAB$_0$~ULAB$_3$ of the user logic address bus 137, the user logic read signal (inversion signal of ULRD) 125, and the user logic write signal (inversion signal of ULWR) 124, and each of the circuits comprises an output buffer 98. Further, the bus I/F 7 is equipped with an output buffer 95.

In response to the external bus read signal (inversion signal of EXRD) 120, each output buffer 96 of the I/F circuits 7a~7d outputs bits DB$_0$~DB$_3$ of the external bus data bus 113 respectively to bits ULDB$_0$~ULDB$_3$ of the user logic data bus 136.

In response to the external bus read signal 120 inverted by the inverter 95, the bus buffer 97 outputs bits ULDB$_0$~ULDB$_3$ of the user logic data bus 136 respectively to bits DB$_0$~DB$_3$ of the external bus data bus 113.

Also, each output buffer 98 of the I/F circuits 7e~7h outputs bits AB$_0$~AB$_3$ of the external bus address bus 114 respectively to bits ULAB$_0$~ULAB$_3$ of the user logic address bus 137.

Also, the output buffer 98 of the I/F circuit 7i outputs the external bus read signal 120 to the user logic read signal 125, and the output buffer 98 of the I/F circuit 7j outputs the external bus write signal (inverted signal of EXWR) to the user logic write signal 124.

Figure 17:
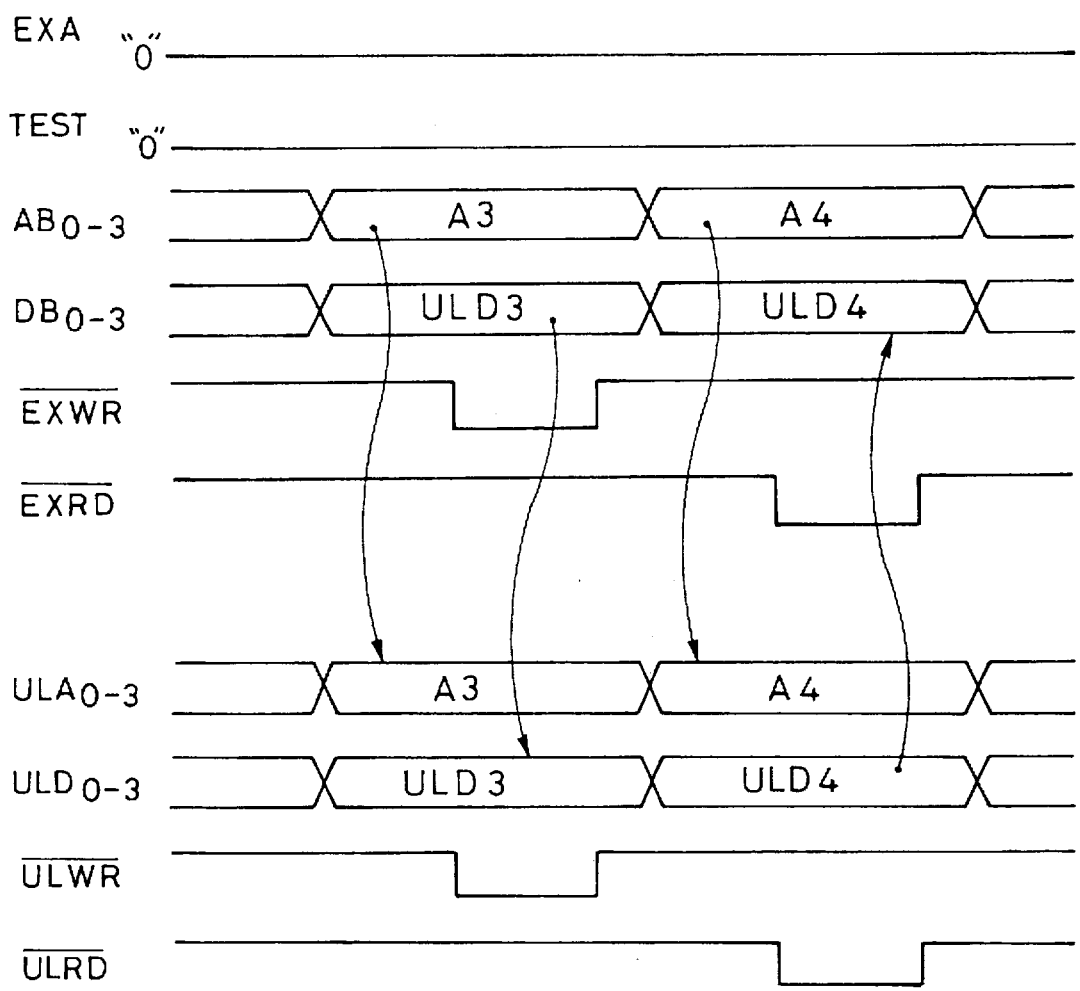
FIG. 17 is a timing chart showing access timings of a user logic unit by the single-chip microcomputer core shown in FIG. 10.

FIG. 17 is a timing chart showing access timings of the user logic unit 8 by the microcomputer core 4 shown in FIG. 10. With reference to FIGS. 10, 16 and 17, the access operation of the user logic unit 8 by the microcomputer core 4 is explained hereunder.

When the user logic unit 8 is accessed, the external access mode signal (EXA) 122 and the test signal (TEST) 104 become "0". At this time, the external bus I/F-port 6 does not operate since the external access mode signal 122 is "0".

When the data is written in the user logic unit 8, the address "A$_3$", the data "ULD$_3$", and the write signal are outputted to the user logic unit 8.

Bits AB$_0$~AB$_3$ of the address "A$_3$" on the external bus address bus 114 are outputted respectively to bits ULAD$_0$~ULAD$_3$ of the user logic address bus 137 through respective AND gates 98 of the I/F circuits 7e~7h.

Next, when the external bus write signal (inversion signal of EXWR) 119 turns to "0", the user logic write signal (inversion signal of ULWR) 124 becomes "0".

Under the above state, since the external bus read signal (inversion signal of EXRD) 120 is "1", bits DB$_0$~DB$_3$ of the data "ULD$_3$" on the external bus data bus 113 are outputted respectively to bits ULAD$_0$~ULAD$_3$ of the user logic data bus 136 through respective output buffers 96 of the I/F circuits 7a~7d. In this way, the data "ULD$_3$" is written into the address "A3" of the user logic unit 8.

Also, when the data from the user logic unit 8 is read, the address "A$_4$" and the read signal are outputted to the user logic unit 8.

Bits AB$_0$~AB$_3$ of the address "A$_4$" on the external bus address bus 114 are outputted to bits ULAD$_1$~ULAD$_3$ of the user logic address bus 137 through respective output buffers 98 of the I/F circuits 7e~7h.

Subsequently, when the external bus read signal 120 becomes "0", the data "ULD$_4$" read from the address "A$_4$" of the user logic unit 8 is outputted to each of bits ULAD$_0$~ULAD$_3$ of the user logic data bus 136.

Also, when the external bus read signal 120 becomes "0", bits ULAD$_0$~ULAD$_4$ of the data "ULD$_4$" of the user logic data bus 136 are outputted respectively to bits DB$_0$~DB$_3$ of the external bus data bus 113 through the bus buffer 97, and the data "ULD$_4$" of the user logic unit 8 is inputted to the microcomputer core 4.

Thus, the user logic unit 8 requires the read/write circuit for being connected to the bus signal but the circuit designing can be made easily with a small number of access signals. Also, since the external bus is an asynchronous bus without clock functions, the user logic unit can operate with timings totally independent from those in the microcomputer core 4.

Figure 18:
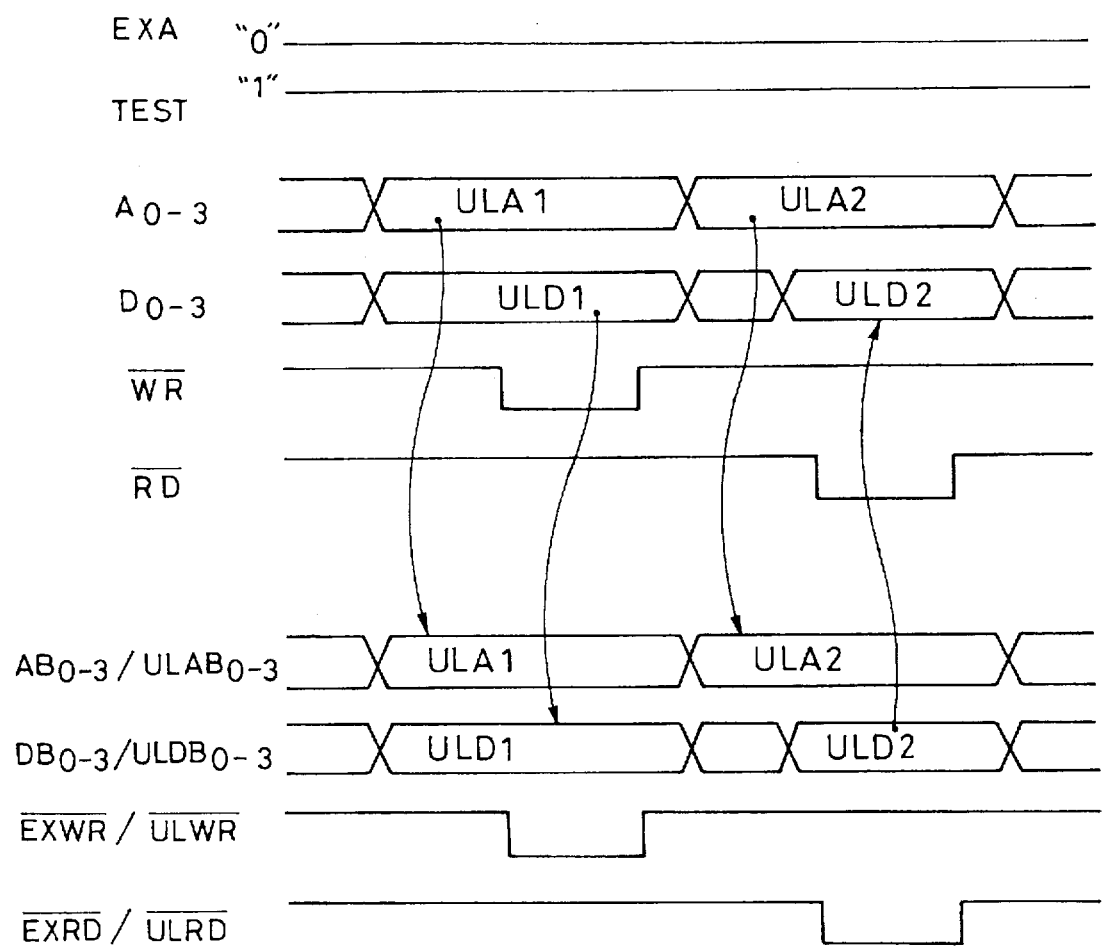
FIG. 18 is a timing chart showing access timings during the testing of the user logic unit shown in FIG. 10.

FIG. 18 is a timing chart showing access timings during the testing of the user logic unit 8 shown in FIG. 10. With reference to FIGS. 10, 16 and 18, the access operation during the testing of the user logic unit 8 is explained hereunder.

When the user logic unit 8 is tested, the AD$_{0-3}$ signal, WR inversion signal, RD inversion signal are inputted from the exterior and the user logic unit 8 is directly accessed from the exterior. That is, in the first embodiment of the invention, it is configured that the user logic unit 8 as a unit is accessed and tested.

When the user logic unit 8 is tested, the test signal (TEST) 104 inputted from the terminal 6 becomes "1". In the microcomputer core 4, when the test signal 104 becomes "1", the external bus data bus (DB$_{0-3}$) 113 related to the external bus I/F-port 1 is separated from the external bus address bus (AB$_{0-3}$) 114, the external bus write signal (inversion signal of EXWR) 119, the external bus read signal (inversion signal of EXRD) 120, and the address strobe signal (AS) 121.

When the user logic unit 8 is accessed, the AD$_{0-3}$ signal, WR inversion signal, RD inversion signal from the exterior are outputted through the external bus I/F-port 6 to the external bus data bus 113, the external bus address bus 114, the external bus write signal 119, and the external bus read signal 120, respectively.

When the data is written into the user logic unit 8 from the exterior, the external bus write signal 119 turns to "0", the user logic write signal (inversion signal of ULWR) 124 becomes "0". At this time, the address "$ULA_1$", the data "$ULD_1$" and the write signal are outputted to the user logic unit 8.

The bits $AB_0$~$AB_3$ of the address "$ULA_1$" on the external bus address bus 114 are outputted respectively to bits $ULAB_0$~$ULAB_3$ of the user logic address bus 137 through respective output buffers 98 of the I/F circuits 7e~7h.

Next, when the external bus write signal 119 becomes "0", the user logic write signal (inversion signal of ULWR) 124 becomes "0".

Under the above state, since the external bus read signal 120 is "1", bits $DB_0$~$DB_3$ of the data "$ULD_1$" on the external bus data bus 113 are outputted respectively to bits $ULAD_0$~$ULAD_3$ of the user logic data bus 136 through respective output buffers 96 of the I/F circuits 7a~7d. In this way, the data "$ULD_1$" is written into the address "$ULA_1$" of the user logic unit 8.

Also, when the data to the exterior from the user logic unit 8 is read, bits $AB_0$~$AB_3$ of the address "$ULA_2$" on the external bus address bus 114 are outputted respectively to bits $ULAD_0$~$ULAD_3$ of the user logic address bus 137 through respective output buffers 98 of the I/F circuits 7e~7h.

Subsequently, when the external bus read signal 120 becomes "0", the data "$ULD_2$" read from the address "$ULA_2$" of the user logic unit 8 is outputted to each of bits $ULAD_0$~$ULAD_3$ of the user logic data bus 136.

Also, when the external bus read signal 120 becomes "0", bits $ULAD_0$~$ULAD_4$ of the data "$ULD_2$" on the user logic data bus 136 are outputted respectively to bits $DB_0$~$DB_3$ of the external bus data bus 113 through the respective bus buffers 97, and the data "$ULD_2$" of the user logic unit 8 is outputted to the exterior through the external bus I/F·port 1.

The user logic unit 8 is designed by the user, and the test pattern prepared for testing the user logic unit 3 as a unit is used for the testing.

Since the single-chip microcomputer 9 in which the user logic unit 8 is built-in is accessed as a unit from the exterior, it is possible to carry out the necessary testing by using the aforementioned test pattern and, as a result, it is unnecessary to design a separate test pattern for purposes of testing the user logic unit 8.

As above, since the interface between the microcomputer core 4 and the user logic unit 3 or 8 is made to have the same signal and timings as those in an ordinary external bus which is an asynchronous bus, it has become easier to design the interface circuit between the microcomputer core 4 and the user logic unit 3 or 8.

Also, it is now possible to design the user logic unit 3 or 8 with free operation timings independently of the operation timings of the microcomputer core 4. Furthermore, since the test pattern for testing the user logic unit 3 or 8 prepared by the user as a unit can be used for testing the user logic unit 3 or 8 built in the single-chip microcomputer 5 or 9, it is possible to reduce the number of the steps involved in preparing the test pattern.

In addition, despite the fact that the user logic unit 3 or 8 is accessed by the external bus timings, the single-chip microcomputer 5 or 9 can use the external bus I/F·port 1 or 6 as a port.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A single-chip microcomputer comprising:
   a microcomputer core which has a central processing unit (CPU), a memory unit, a peripheral function unit, and a main internal bus interconnecting said units under control of a CPU operation clock signal supplied from said CPU;
   an external bus interface circuit forming an asynchronous interface between said single-chip microcomputer and external circuits exterior thereto by enabling said single-chip microcomputer to have asynchronous access independent of said CPU operation clock signal to and from said external circuits;
   an asynchronous internal bus for interconnecting said microcomputer core and said external bus interface circuit so as to enable said asynchronous access to and from said external circuits;
   a logic circuit for receiving said asynchronous access from both said microprocessor core and said external circuits through said asynchronous internal bus to provide functions specific to a user of said single-chip microcomputer; and
   a bus interface circuit forming an interface between said asynchronous internal bus and said logic circuit by providing an asynchronous access control signal based on an access control signal supplied through said asynchronous internal bus.

2. The single-chip microcomputer according to claim 1, wherein said external bus interface circuit is arranged to provide said asynchronous access to and from said external circuits by producing an asynchronous access control signal to said external circuits when an access mode signal indicating an access to said external circuits from said microcomputer core is inputted.

3. The single-chip microcomputer according to claim 1, wherein said microcomputer core is arranged to terminate its connection with said asynchronous internal bus when a test signal indicating a test of said logic circuit is inputted, and
   wherein said bus interface circuit is arranged to produce an asynchronous access control signal to said logic circuit in response to an access control signal from the exterior when said test signal is inputted.

4. The single-chip microcomputer according to claim 1, wherein said external interface circuit is connected to said external circuits through an address bus and a control bus.

5. The single-chip microcomputer according to claim 1, wherein said external interface circuit is connected to said external circuits through a data bus, a control bus, and an address bus.

6. A single-chip microcomputer according to claim 1, wherein said bus interface circuit is connected to said logic circuit through a user logic address data bus, a user logic write signal line, a user logic read signal line, and a user logic address strobe signal line.

7. The single-chip microcomputer according to claim 1, wherein said bus interface circuit is connected to said logic circuit through a user logic data bus, a user logic address data bus, a user logic read signal line, and a user logic write signal line.

8. The single-chip microcomputer according to claim 1, wherein said asynchronous internal bus is provided separately from said main internal bus.

9. The single-chip microcomputer according to claim 8, wherein said logic circuit is for being accessed for test from the exterior in response to a test mode signal and a test pattern supplied from the exterior through the asynchronous internal bus independently of the CPU.

10. The single-chip microcomputer according to claim 1, wherein an access by said CPU to the external circuits and the logic circuit is performed without restriction by the CPU operation clock signal and without increasing an overhead of the CPU.

11. The single-chip microcomputer according to claim 1, wherein said asynchronous internal bus and said external bus interface circuit are separate from said main internal bus.

12. The single-chip microcomputer according to claim 1, wherein said logic circuit is testable independently of the microprocessor core based on a test pattern applicable locally to the logic circuit without increasing the CPU overhead, by terminating a connection of said microcomputer core with said asynchronous internal bus and providing the test pattern from said external circuits through said asynchronous internal bus, in response to a test mode signal supplied from the exterior.

* * * * *